(12) United States Patent
Ishikawa et al.

(10) Patent No.: US 7,002,636 B2
(45) Date of Patent: Feb. 21, 2006

(54) VIDEO SIGNAL CONTOUR CORRECTOR

(75) Inventors: Yuichi Ishikawa, Hyogo (JP); Mitsuaki Shinba, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 562 days.

(21) Appl. No.: 10/332,127

(22) PCT Filed: May 9, 2002

(86) PCT No.: PCT/JP02/04514

§ 371 (c)(1),
(2), (4) Date: Mar. 4, 2003

(87) PCT Pub. No.: WO02/093907

PCT Pub. Date: Nov. 21, 2002

(65) Prior Publication Data

US 2003/0156224 A1   Aug. 21, 2003

(30) Foreign Application Priority Data

May 11, 2001   (JP) ............................ 2001-141221

(51) Int. Cl.
*H04N 5/208*   (2006.01)
(52) U.S. Cl. ..................... 348/625; 348/627; 382/266

(58) Field of Classification Search ........ 348/625–631, 348/606; 382/266–282
See application file for complete search history.

(56) References Cited

U.S. PATENT DOCUMENTS

| 5,247,361 | A | * | 9/1993 | Izawa et al. ................ 348/625 |
| 5,404,180 | A | * | 4/1995 | Kitano et al. ............... 348/625 |
| 5,559,563 | A | * | 9/1996 | Takahashi et al. .......... 348/625 |

FOREIGN PATENT DOCUMENTS

| JP | 4-296171 | 10/1992 |
| JP | 5-014771 | 1/1993 |
| JP | 7-57009 | 6/1995 |

* cited by examiner

*Primary Examiner*—Michael H. Lee
(74) *Attorney, Agent, or Firm*—Wenderoth, Lind & Ponack, L.L.P.

(57) ABSTRACT

A gray scale correction unit intended to provide a gray scale correction unit for preventing aliasing-like noise generation and gray-scale degradation of a gradation portion adaptively controls a correction value in accordance with the slope of a video signal, detects generation of aliasing-like noise, steepens an edge having a large amplitude without deterioration in the image quality, and improves a spatial frequency of the video signal.

7 Claims, 19 Drawing Sheets

Fig. 2

| Time / Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa  | 40 | 40 | 40 | 40 | 40 | 40 | 38 | 36 | 34 | 32 | 30 | 28 | 26 | 24 | 22 | 20 | 20 | 20 | 20 |
| Sb  |    | 40 | 40 | 40 | 40 | 40 | 40 | 40 | 38 | 36 | 34 | 32 | 30 | 28 | 26 | 24 | 22 | 20 | 20 |
| Sc  |    |    | 0  | 0  | 0  | 0  | -2 | -4 | -4 | -4 | -4 | -4 | -4 | -4 | -4 | -4 | -2 | 0  | 0  |
| Sd  |    |    | 0  | 0  | 0  | 0  | 0  | 0  | -2 | -4 | -4 | -4 | -4 | -4 | -4 | -4 | -4 | -4 | -2 |
| Se  |    |    | 0  | 0  | 0  | 0  | 0  | 0  | -2 | -4 | -4 | -4 | -4 | -4 | -4 | -4 | -2 | 0  | 0  |
| Sf  |    |    | 0  | 0  | 0  | 0  | 0  | 0  | 0  | -4 | -2 | -4 | -4 | -4 | -4 | -4 | -4 | -4 | -2 |
| Sg  |    |    | 0  | 0  | 0  | 0  | 0  | 0  | -2 | -2 | -2 | 0  | 0  | 0  | 0  | 0  | 2  | 4  | 2  |
| Sh  |    |    | 0  | 0  | 0  | 0  | 0  | 0  | 0  | -2 | -2 | -4 | -4 | -4 | -4 | -4 | -4 | -2 | 0  |
| Si1 |    |    | 0  | 0  | 0  | 0  | 0  | 0  | 0  | -2 | -2 | 0  | 0  | 0  | 0  | 0  | 2  | 2  | 0  |
| Sm  |    |    | 0  | 0  | 0  | 0  | 0  | 0  | -2 | -4 | -4 | -4 | -4 | -4 | -4 | -4 | -4 | -4 | -2 |
| Ss  |    |    |    |    |    | 0  | 0  | 0  | 0  | 0  | 1  | 0  | 0  | 0  | 0  | 0  | -1 | -1 | 0  |
| Sj  |    |    |    | 40 | 40 | 40 | 40 | 40 | 40 | 38 | 36 | 34 | 32 | 30 | 28 | 26 | 24 | 22 | 20 |
| Sk1 |    |    |    | 40 | 40 | 40 | 40 | 40 | 40 | 38 | 36 | 34 | 32 | 30 | 28 | 26 | 25 | 23 | 20 |

Fig. 4

| Time / Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa | 40 | 40 | 40 | 40 | 40 | 40 | 38 | 36 | 34 | 32 | 30 | 28 | 26 | 24 | 22 | 20 | 20 | 20 | 20 |
| Sb |  | 40 | 40 | 40 | 40 | 40 | 40 | 40 | 38 | 36 | 34 | 32 | 30 | 28 | 26 | 24 | 22 | 20 | 20 |
| Sc |  |  | 0 | 0 | 0 | 0 | -2 | -4 | -4 | -4 | -4 | -4 | -4 | -4 | -4 | -4 | -2 | 0 | 0 |
| Sd |  |  | 0 | 0 | 0 | 0 | 0 | 0 | -2 | -4 | -4 | -4 | -4 | -4 | -4 | -4 | -4 | -4 | -2 |
| Se |  |  | 0 | 0 | 0 | 0 | 0 | 0 | -2 | -4 | -4 | -4 | -4 | -4 | -4 | -4 | -2 | 0 | 0 |
| Sf |  |  | 0 | 0 | 0 | 0 | 0 | 0 | 0 | 0 | -2 | -4 | -4 | -4 | -4 | -4 | -4 | -4 | -2 |
| Sg |  |  | 0 | 0 | 0 | 0 | 0 | 0 | 0 | -4 | -2 | 0 | 0 | 0 | 0 | 0 | 2 | 4 | 2 |
| Sh |  |  | 0 | 0 | 0 | 0 | 0 | 0 | 0 | -2 | -4 | -4 | -4 | -4 | -4 | -4 | -4 | -2 | 0 |
| Si1 |  |  | 0 | 0 | 0 | 0 | 0 | 0 | 0 | -2 | 0 | 0 | 0 | 0 | 0 | 0 | 2 | 2 | 0 |
| Sj |  |  |  | 40 | 40 | 40 | 40 | 40 | 40 | 38 | 36 | 34 | 32 | 30 | 28 | 26 | 24 | 22 | 20 |
| Sk1n |  |  |  | 40 | 40 | 40 | 40 | 40 | 40 | 38 | 36 | 34 | 32 | 30 | 28 | 26 | 25 | 23 | 20 |

Fig. 7

| Time / Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa | 104 | 104 | 104 | 108 | 108 | 110 | 140 | 100 | 100 | 60 | 20 | 20 | 20 | 20 | 20 | 20 | 20 | 20 | 20 |
| Sn |  | 104 | 104 | 104 | 108 | 108 | 110 | 140 | 100 | 100 | 60 | 20 | 20 | 20 | 20 | 20 | 20 | 20 | 20 |
| Sp |  | 0 | 0 | 4 | 0 | 2 | 30 | -40 | 0 | -40 | -40 | 0 | 0 | 0 | 0 | 0 | 0 | 0 | 0 |
| Sb |  |  | 104 | 104 | 104 | 108 | 108 | 110 | 140 | 100 | 100 | 60 | 20 | 20 | 20 | 20 | 20 | 20 | 20 |
| Sc |  |  | 0 | 4 | 4 | 2 | 32 | -10 | -40 | -40 | -80 | -40 | 0 | 0 | 0 | 0 | 0 | 0 | 0 |
| Sd |  |  | 0 | 0 | 0 | 4 | 4 | 2 | 32 | -10 | -40 | -40 | -80 | -40 | 0 | 0 | 0 | 0 | 0 |
| Se |  |  | 0 | 0 | 0 | 2 | 4 | 0 | 0 | -10 | -40 | -40 | 0 | 0 | 0 | 0 | 0 | 0 | 0 |
| Sf |  |  | 0 | 0 | 0 | 0 | 4 | 2 | 4 | 0 | 0 | -10 | -40 | -40 | 0 | 0 | 0 | 0 | 0 |
| Sg |  |  | 0 | 0 | 0 | 2 | 2 | -2 | -4 | -10 | -40 | -30 | 40 | 40 | 0 | 0 | 0 | 0 | 0 |
| Sh |  |  | 0 | 0 | 0 | 0 | 4 | 4 | 0 | 0 | 0 | -40 | -40 | 0 | 0 | 0 | 0 | 0 | 0 |
| Sq |  |  |  | 0 | 0 | 0 | 2 | 0 | 2 | 30 | 0 | 0 | -40 | -40 | 0 | 0 | 0 | 0 | 0 |
| Si2 |  |  | 0 | 0 | 0 | 0 | 4 | 0 | 0 | 0 | -40 | 0 | 40 | 0 | 0 | 0 | 0 | 0 | 0 |
| Sj |  |  |  | 104 | 104 | 104 | 108 | 108 | 110 | 140 | 100 | 100 | 60 | 20 | 20 | 20 | 20 | 20 | 20 |
| Sk2 |  |  |  | 104 | 104 | 104 | 106 | 108 | 110 | 140 | 110 | 100 | 20 | 20 | 20 | 20 | 20 | 20 | 20 |

Fig. 9

| Time<br>Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa | 104 | 104 | 104 | 108 | 108 | 110 | 140 | 100 | 100 | 60 | 20 | 20 | 20 | 20 | 20 | 20 | 20 | 20 | 20 |
| Sb |  |  | 104 | 104 | 104 | 108 | 108 | 110 | 140 | 100 | 100 | 60 | 20 | 20 | 20 | 20 | 20 | 20 | 20 |
| Sc |  |  | 0 | 4 | 4 | 2 | 32 | −10 | −40 | −40 | −80 | −40 | 0 | 0 | 0 | 0 | 0 | 0 | 0 |
| Sd |  |  | 0 | 0 | 0 | 4 | 4 | 2 | 32 | −10 | −40 | −40 | −80 | −40 | 0 | 0 | 0 | 0 | 0 |
| Se |  |  | 0 | 0 | 0 | 2 | 4 | 0 | 0 | −10 | −40 | −40 | 0 | 0 | 0 | 0 | 0 | 0 | 0 |
| Sf |  |  | 0 | 0 | 0 | 0 | 0 | 2 | 4 | 0 | 0 | −10 | −40 | −40 | 0 | 0 | 0 | 0 | 0 |
| Sg |  |  | 0 | 0 | 0 | 2 | 4 | −2 | −4 | −10 | 0 | −30 | 40 | 40 | 0 | 0 | 0 | 0 | 0 |
| Sh |  |  | 0 | 0 | 0 | 0 | 2 | 4 | 0 | 0 | −40 | −40 | −40 | −40 | 0 | 0 | 0 | 0 | 0 |
| Si2 |  |  | 0 | 0 | 0 | 0 | 2 | 0 | 0 | 0 | −10 | 0 | 40 | 0 | 0 | 0 | 0 | 0 | 0 |
| Sj |  |  |  | 104 | 104 | 104 | 108 | 108 | 110 | 140 | 100 | 100 | 60 | 20 | 20 | 20 | 20 | 20 | 20 |
| Sk2n |  |  |  | 104 | 104 | 104 | 106 | 108 | 110 | 140 | 110 | 100 | 20 | 20 | 20 | 20 | 20 | 20 | 20 |

Fig. 11

| Time / Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa | 100 | 100 | 100 | 120 | 140 | 110 | 110 | 80 | 60 | 40 | 60 | 20 | 20 | 20 | 20 | 20 | 20 | 20 | 20 |
| Sn |  | 100 | 100 | 100 | 120 | 140 | 110 | 110 | 80 | 60 | 40 | 60 | 20 | 20 | 20 | 20 | 20 | 20 | 20 |
| Sp |  | 0 | 0 | 20 | 20 | -30 | 0 | -30 | -20 | -20 | 20 | -40 | 0 | 0 | 0 | 0 | 0 | 0 | 0 |
| Sb |  |  | 100 | 100 | 100 | 120 | 140 | 110 | 110 | 80 | 60 | 40 | 60 | 20 | 20 | 20 | 20 | 20 | 20 |
| Sc |  |  | 0 | 20 | 40 | -10 | -30 | -30 | -50 | -40 | 0 | -20 | -40 | 0 | 0 | 0 | 0 | 0 | 0 |
| Sd |  |  | 0 | 0 | 0 | 20 | 40 | -10 | -30 | -30 | -50 | -40 | 0 | -20 | -40 | 0 | 0 | 0 | 0 |
| Se |  |  | 0 | 0 | 0 | 0 | 0 | -10 | -30 | -10 | 0 | -20 | 0 | 0 | 0 | 0 | 0 | 0 | 0 |
| Sf |  |  | 0 | 0 | 0 | 0 | 0 | -10 | -30 | -30 | -30 | -30 | 0 | -20 | 0 | 0 | 0 | 0 | 0 |
| Sg |  |  | 0 | 0 | 0 | 0 | 0 | 0 | 0 | -10 | 30 | 10 | 0 | 20 | 0 | 0 | 0 | 0 | 0 |
| Sh |  |  | 0 | 0 | 0 | 0 | 20 | 20 | -30 | -20 | -30 | -20 | -20 | 0 | 0 | 0 | 0 | 0 | 0 |
| Sq |  |  | 0 | 0 | 0 | 0 | 0 | 0 | -10 | 0 | 30 | 0 | 0 | 20 | -40 | 0 | 0 | 0 | 0 |
| Si2 |  |  |  | 100 | 100 | 100 | 120 | 140 | 110 | 110 | 80 | 60 | 40 | 60 | 20 | 20 | 20 | 20 | 20 |
| Sj |  |  | 0 | 100 | 100 | 100 | 120 | 140 | 110 | 110 | 50 | 60 | 40 | 60 | 20 | 20 | 20 | 20 | 20 |
| Sk2 |  |  |  | 100 | 100 | 100 | 120 | 140 | 120 | 110 | 50 | 60 | 40 | 60 | 20 | 20 | 20 | 20 | 20 |

Fig. 14

| Time / Signal | 1T | 2T | 3T | 4T | 5T | 6T | 7T | 8T | 9T | 10T | 11T | 12T | 13T | 14T | 15T | 16T | 17T | 18T | 19T |
|---|---|---|---|---|---|---|---|---|---|---|---|---|---|---|---|---|---|---|---|
| Sa | 100 | 100 | 100 | 120 | 140 | 110 | 110 | 80 | 60 | 40 | 60 | 20 | 20 | 20 | 20 | 20 | 20 | 20 | 20 |
| Sn |  | 100 | 100 | 100 | 120 | 140 | 110 | 110 | 80 | 60 | 40 | 60 | 20 | 20 | 20 | 20 | 20 | 20 | 20 |
| Sp |  |  | 0 | 20 | 20 | -30 | 0 | -30 | -20 | -20 | 20 | -40 | 0 | 0 | 0 | 0 | 0 | 0 | 0 |
| Sb |  |  | 100 | 100 | 100 | 120 | 140 | 110 | 110 | 80 | 60 | 40 | 60 | 20 | 20 | 20 | 20 | 20 | 20 |
| Sc |  |  | 0 | 20 | 40 | -10 | -30 | -30 | -50 | -40 | 0 | -20 | -40 | -20 | 0 | 0 | 0 | 0 | 0 |
| Sd |  |  | 0 | 0 | 0 | 20 | 40 | -10 | -30 | -30 | -50 | -40 | 0 | -20 | -40 | 0 | 0 | 0 | 0 |
| Se |  |  | 0 | 0 | 0 | 0 | 0 | -10 | -30 | -30 | 0 | -20 | 0 | 0 | 0 | 0 | 0 | 0 | 0 |
| Sf |  |  | 0 | 0 | 0 | 0 | 0 | -10 | -30 | -10 | -30 | -30 | 0 | -20 | 0 | 0 | 0 | 0 | 0 |
| Sg |  |  | 0 | 0 | 0 | 0 | 0 | 0 | 0 | -20 | 30 | 10 | -20 | 20 | 0 | 0 | 0 | 0 | 0 |
| Sh |  |  | 0 | 0 | 0 | 0 | 20 | 0 | -30 | -30 | -30 | -30 | -20 | -20 | -40 | -40 | 0 | 0 | 0 |
| Sq |  |  |  |  | 0 | 0 | 0 | 20 | 20 | 0 | 0 | 0 | -20 | -20 | 20 | 0 | 0 | 0 | 0 |
| Sr |  |  |  |  | 0 | 0 | 0 | 20 | -10 | -30 | -30 | -30 | -30 | -20 | -40 | -40 | 0 | 0 | 0 |
| Si2 |  |  |  |  | 0 | 0 | 0 | 0 | 20 | 0 | 0 | 0 | 0 | 20 | 20 | 0 | 0 | 0 | 0 |
| Sj |  |  |  |  | 100 | 100 | 120 | 140 | 110 | 110 | 80 | 60 | 40 | 60 | 20 | 20 | 20 | 20 | 20 |
| Sk3 |  |  |  |  | 100 | 100 | 120 | 140 | 120 | 110 | 80 | 60 | 40 | 60 | 20 | 20 | 20 | 20 | 20 |

VIDEO SIGNAL CONTOUR CORRECTOR

TECHNICAL FIELD

This invention relates to a contour corrector for correcting the contour of a video image so as to become clearer by making steeper a rise or fall of a portion of a video signal which is used for a television receiver or the like, and more particularly to a contour corrector which varies the steepening method depending on the state of the video signal, thus not undermining the characteristics of the original video image.

BACKGROUND ART

Conventionally, various contour correction techniques and contour correctors have been put to practical use, which, in order to make the contour portion of a video image clearer, steepens the rise or fall of a contour component corresponding to the video image.

FIG. 17 illustrates a contour corrector which corrects the contour of a video signal disclosed in Japanese Patent Examined Publication No. 7-57009, as a typical example of such a conventional contour corrector. As shown in this figure, a contour corrector OEc includes a delay circuit 1, a subtraction circuit 2, a delay circuit 3, a minimum value circuit 4, a delay circuit 5, a subtraction circuit 6, a delay circuit 7, a minimum value circuit 8, a delay circuit 9, and a subtraction circuit 10.

The delay circuit 1, which is coupled to an external video signal source (not shown), delays an inputted video signal a by a first predetermined time P1 to generate a delayed input video signal b. The subtraction circuit 2 has a plus-side input port which is coupled to the aforementioned video signal source to receive the video signal a, and a minus-side input port which is coupled to the delay circuit 1 to receive the delayed input video signal b. Then, it subtracts the delayed input video signal b from the video signal a, thereby generating a primary differential signal c.

The delay circuit 3, which is coupled to the subtraction circuit 2, receives the primary differential signal c. The delay circuit 3 further delays the inputted primary differential signal c by a second predetermined time P2, thereby generating a delayed primary differential signal d.

The minimum value circuit 4, which is coupled to the subtraction circuit 2 and the delay circuit 3, receives the primary differential signal c and the delayed primary differential signal d therefrom. Then, the minimum value circuit 4 finds a minimum value among the inputted primary differential signal c and the delayed primary differential signal d, thereby generating a minimum primary differential signal e.

The delay circuit 5 and the delay circuit 7 are both coupled to the minimum value circuit 4 to receive the minimum primary differential signal e. Then, the inputted minimum primary differential signal e is delayed by the delay circuit 5 by a third predetermined time P3, whereby a first delayed minimum primary differential signal f is generated. Similarly, the minimum primary differential signal e is delayed by the delay circuit 7 by a fourth predetermined time P4, whereby a second delayed minimum primary differential signal h is generated.

The subtraction circuit 6 has a plus-side input port which is coupled to the minimum value circuit 4 to receive the minimum primary differential signal e, and a minus-side input port which is coupled to the delay circuit 5 to receive the first delayed minimum primary differential signal f. The subtraction circuit 6 subtracts the first delayed minimum primary differential signal f from the inputted minimum primary differential signal e, thereby generating a secondary differential signal g.

The minimum value circuit 8, which is coupled to the subtraction circuit 6 and the delay circuit 7, receives the secondary differential signal g and the second delayed minimum primary differential signal h therefrom. The minimum value circuit 8 finds a minimum value among the inputted secondary differential signal g and the second delayed minimum primary differential signal h, thereby generating a correction signal i.

The delay circuit 9, which is coupled to the aforementioned video signal source, receives the video signal a. Then, the delay circuit 9 delays the inputted video signal a by a fifth predetermined time P5, thereby generating a delayed input video signal j.

The subtraction circuit 10 has a plus-side input port which is coupled to the delay circuit 9 to receive the delayed input video signal j, and a minus-side input port which is coupled to the minimum value circuit 8 to receive the correction signal i. The subtraction circuit 10 subtracts the correction signal i from the inputted delayed input video signal j, thereby obtaining an output video signal k.

Next, with reference to FIG. 18, a contour correction operation for a video signal by the contour corrector OEc structured as above will be described. First, the input video signal a is delayed by the delay unit 1 to obtain the delayed video input signal b. This delayed video input signal b is subtracted from the input video signal a at the subtraction circuit 2 to obtain the primary differential signal c. Next, the primary differential signal c is delayed at the delay unit 3 by the first predetermined time, as done in the delay unit 1, to obtain the delayed primary differential signal d.

Then, the minimum value circuit 4 selects one of the primary differential signal c and the delayed primary differential signal d that has a smaller absolute value, and outputs it to the minimum primary differential signal e. However, if the sign of the primary differential signal c is different from that of the delayed primary differential signal d, "0" is outputted as the minimum primary differential signal e. The minimum primary differential signal e will always have an extent equal to a rise or fall of the contour portion the input video signal a.

Next, by means of the delay unit 5 and the delay circuit 7, the minimum primary differential signal e is delayed by the third predetermined time P3 and the fourth predetermined time P4, respectively, whereby the first delayed minimum primary differential signal f and the second delayed minimum primary differential signal h are obtained. Note that the fourth predetermined time P4 is ½ of the third predetermined time P3 (P4=P3/2).

Next, the subtraction circuit 6 subtracts the first delayed minimum primary differential signal f from the minimum primary differential signal e to obtain the secondary differential signal g. In the minimum value circuit 8, one of the secondary differential signal g and the second delayed minimum primary differential signal h that has a smaller absolute value is selected, whereby the correction signal i is obtained. Note that the same sign as that of the secondary differential signal g is employed.

Next, the subtraction circuit 10 subtracts the correction signal i from the delayed input video signal j to obtain the output video signal k. Note that the delayed input video signal j is a signal obtained by delaying the video signal a by a time (the fifth predetermined time P5) which is required for the aforementioned computation process. As a result, the output video signal k will always have the same extent as that of the rise or fall time of the contour portion of the input video signal a, so that contour correction can be performed without preshoot or overshoot.

Thus, in accordance with the contour corrector OEc, synchronization is maintained between the minimum primary differential signal e and the second delayed minimum primary differential signal h, and the fourth predetermined time P4 is set to be a half of the third predetermined time P3. Moreover, the first predetermined time P1, the second predetermined time P2, the third predetermined time P3, the fourth predetermined time P4, and the fifth predetermined time P5 are appropriately set in accordance with the contour corrector OEc, so that the correction signal i can be obtained so as to be within a rise or fall period of the contour portion of the video signal a. By subtracting this correction signal i from the video signal a, the output video signal k can be obtained, which has a contour that is steeper and narrower than that of the input signal, without preshoot or overshoot.

FIG. 19 shows an example of a preferable relationship between the video signal a and the output video signal k in the contour corrector OEc. In this figure, the solid line represents the inputted video signal a, whereas the dot-dash line represents the output video signal k which has been subjected to contour correction by the contour corrector OEc. In this example, the slopes of the rising edge and the falling edge of the output video signal k are greater than their respective counterparts of the video signal a. In other words, the output video signal k is corrected so as to have a clearer contour than that of the video signal a. Thus, the contour corrector OEc can provide effective correction in the case where the video signal a is a so-called contour signal, whose density or intensity changes with a predetermined amplitude or greater.

However, the preferable example shown in FIG. 16 is limited to the case where the contour portion of the video signal a has a slope which is equal to or greater than a predetermined value and is within a predetermined period. In the case where the contour portion of the video signal a is a gradation signal whose slope is equal to or less than the predetermined value (especially if the slope changes) and spanning over the predetermined period, or in the case where the video signal a is a wave form signal following a specific pattern, the contour corrector OEc cannot provide the preferable result as shown in FIG. 19.

Hereinafter, with reference to FIG. 20 and FIG. 21, such cases will be described. For visual clarity, a portion corresponding to the falling edge portion encircled by a circle Ven in FIG. 19 is illustrated in FIG. 20 and FIG. 21. In these figures, too, a solid line represents the video signal a, whereas a dot-dash line represents the output video signal k.

First, FIG. 20 illustrates an example of the video signal a and the output video signal k in the case where the video signal a is a gradation signal which undergoes a monotonous increase or decrease with a small amplitude. In accordance with the contour corrector OEc, a contour correction which is similar to that performed for a contour signal which undergoes drastic changes with a predetermined amplitude or greater is performed even for a gradation signal which undergoes a monotonous increase or decrease with a small amplitude. Therefore, as in the portion encircled by a circle Lp in the figure, if the video signal a as a gradation signal varies with a slightly great amplitude relative to its surroundings, the slope of the output video signal k will drastically vary due to the contour correction provided by the contour corrector OEc. However, it should be clear that such a contour correction is undesirable for a gradation signal which is supposed to vary in a monotonous manner, as in the case where the gradation signal is directed to human skin.

Next, in FIG. 21, if the video signal a has a peak Po which is composed continuously of an increasing portion and a decreasing portion, for example, the output video signal k has two peaks Pm and Pe corresponding to Po. As compared to the video signal a, the extra peak Pm is created in the output video signal k. Thus, the characteristics of the video signal a are clearly degraded.

Accordingly, the present invention aims to provide a contour corrector which solves the specific problem of the contour corrector OEc in that, as described above, a proper contour correction cannot be provided for a gradation signal or a waveform signal which has a peak near a contour portion, and to clarify the optimum values of the first predetermined time P1, the second predetermined time P2, the third predetermined time P3, the fourth predetermined time P4, and the fifth predetermined time P5 as are clearly defined.

DISCLOSURE OF THE INVENTION

The present invention has the following features to attain the above object.

A first aspect of the present invention is directed to a contour corrector for processing an input video signal based on a unit period corresponding to a pixel to emphasize a contour component of the input signal, comprising:

a first delay unit for generating a 2T-delayed input video signal by delaying the input video signal by twice the unit period, a first subtraction unit for generating a first primary differential signal by subtracting the first delayed input video signal from the input video signal, a second delay unit for generating a 2T-delayed primary differential signal by delaying the first primary differential signal by twice the unit period, a minimum absolute value computation unit for generating a minimum primary differential signal by selecting a smaller one of the first primary differential signal and the 2T-delayed primary differential signal, a third delay unit for generating a 2T-delayed minimum primary differential signal by delaying the minimum primary differential signal by twice the unit period, a second subtraction unit for generating a secondary differential signal by subtracting the first delayed minimum primary differential signal from the minimum primary differential signal Se, a fourth delay unit for generating a 1T-delayed minimum primary differential signal by delaying the minimum primary differential signal by the unit period, a second minimum value unit for generating a first correction signal by selecting a smaller one of the secondary differential signal and the 1T-delayed minimum primary differential signal, a computation unit for generating a second correction signal by subjecting the first correction signal and the 2T-delayed primary differential signal to a computation based on a predetermined function, a fifth delay unit for delaying the 3T-delayed input video signal by delaying the input video signal by three times the unit period, and a third subtraction unit for generating a contour-corrected video signal by subtracting the second correction signal from the 3T-delayed input video signal.

As described above, according to the first aspect of the present invention, the contour of a video signal is corrected by steepening a signal waveform in a portion undergoing a monotonous increase or monotonous decrease. Furthermore, by adaptively changing the correction value in accordance with the slope of the video signal, contour correction can be performed without degrading the characteristics of the original video image.

A second aspect of the present invention is directed to a contour corrector for processing an input video signal based on a unit period corresponding to a pixel to emphasize a contour component of the input signal, comprising:

a first delay unit for generating a 2T-delayed input video signal by delaying the input video signal by twice the unit period, a first subtraction unit for generating a first primary differential signal by subtracting the first delayed input video signal from the input video signal, a second delay unit for generating a 2T-delayed primary differential signal by delaying the first primary differential signal by twice the unit period, a minimum absolute value computation unit for generating a minimum primary differential signal by selecting a smaller one of the first primary differential signal and the 2T-delayed primary differential signal, a fourth delay unit for generating a 2T-delayed minimum primary differential signal by delaying the minimum primary differential signal by twice the unit period, a second subtraction unit for generating a secondary differential signal by subtracting the first delayed minimum primary differential signal from the minimum primary differential signal Se, a fifth delay unit for generating a 1T-delayed minimum primary differential signal by delaying the minimum primary differential signal by the unit period, a sixth delay unit for generating a 1T-delayed input video signal by delaying the input video signal by the unit period, a third subtraction unit for generating a second primary differential signal by subtracting the 1T-delayed input video signal from the input video signal, a seventh delay unit for generating a 3T-delayed input video signal by delaying the second primary differential signal by three times the unit period, a second minimum value unit for generating a first correction signal by selecting a smallest one of the secondary differential signal, the 1T-delayed minimum primary differential signal, and the second delayed primary differential signal, and a fourth subtraction unit for generating a contour-corrected video signal by subtracting the first correction signal from the 3T-delayed input video signal.

As described above, according to the second aspect of the present invention, the contour of a video signal is corrected by steepening a signal waveform in a portion undergoing a monotonous increase or monotonous decrease, and contour correction can be performed without degrading the characteristics of the original video image, while suppressing any substantial deformation with respect to the characteristics of the original video image.

In a third aspect of the present invention based on the second aspect, an eighth delay unit for generating a 2T-delayed primary differential signal by delaying the second primary differential signal by twice the unit period is further comprised, wherein the second minimum value unit generates the first correction signal by selecting a smallest one of the secondary differential signal, the 1T-delayed minimum primary differential signal, the second delayed primary differential signal, and the 2T-delayed primary differential signal.

As described above, the third aspect of the present invention provides effects similar to those in the second aspect.

In a fourth aspect of the present invention based on the second aspect or the third aspect, a computation unit for generating a second correction signal by subjecting the first correction signal and the 2T-delayed primary differential signal to a computation based on a predetermined function is further comprised, wherein the fourth subtraction unit comprises a third subtraction unit for generating the contour-corrected video signal by subtracting the second correction signal from the 3T-delayed input video signal.

As described above, according to the fourth aspect of the present invention, the contour of a video signal is corrected by steepening a signal waveform in a portion undergoing a monotonous increase or monotonous decrease. Furthermore, by adaptively changing the correction value in accordance with the slope of the video signal, contour correction can be performed without degrading the characteristics of the original video image, while suppressing any substantial deformation with respect to the characteristics of the original video image.

According to a fifth aspect of the present invention based on the first aspect or the fourth aspect, the computation unit performs the computation based on the predetermined function in accordance with a gray scale level of the input video signal.

BRIEF DESCRIPTION OF THE DRAWINGS

FIG. 2 is a diagram illustrating values of various signals processed by the contour corrector shown in FIG. 1.

FIG. 4 is a diagram illustrating values of signals processed by the contour corrector shown in FIG. 1 while disabling an adaptive correction function.

FIG. 7 is a diagram illustrating values of various signals processed by the contour corrector shown in FIG. 6.

FIG. 9 is a diagram illustrating values of signals processed by the contour corrector shown in FIG. 6 while killing a deformation suppression function.

FIG. 11 is a diagram illustrating values of signals related to the processing by the contour corrector shown in FIG. 6 of an input video signal having a discontinuous portion.

FIG. 14 is a diagram illustrating values of various signals processed by the contour corrector shown in FIG. 13.

BEST MODE FOR CARRYING OUT THE INVENTION

In order to more specifically illustrate the present invention, the present invention will be described with reference to the accompanying figures.

(First Embodiment)

Figure 20:
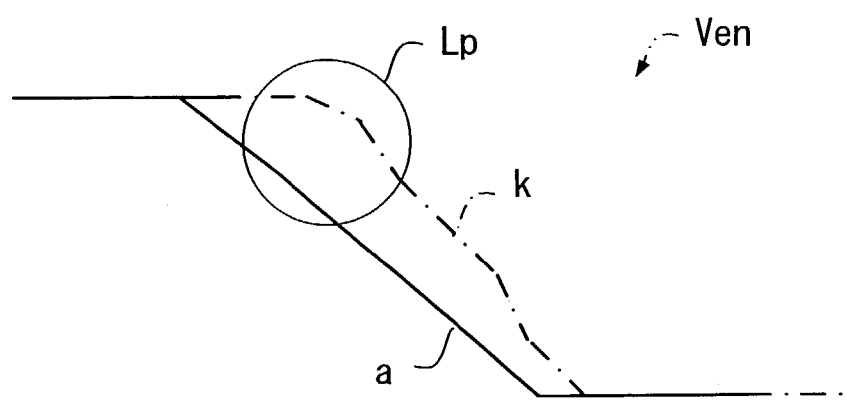
FIG. 20 is an explanatory diagram representing a contour correction result by the contour corrector shown in FIG. 18 of a video signal having a gradation portion with a density gradient equal to or less than a predetermined value.

First, the fundamental concept of the contour corrector according to the present embodiment will be described prior to specific descriptions referring to the figures. A contour corrector OEp1 according to the present embodiment solves the problem concerning a contour correction by the contour corrector OEc for a gradation signal, which has been described with reference to FIG. 20.

As described above, in accordance with the contour corrector OEc, an output video signal k is generated by subtracting a correction signal i from a delayed input video signal j which is obtained by delaying an inputted video signal a by a fifth predetermined time P5. Therefore, in the case where the video signal a is a gradation signal which as a whole undergoes gentle changes in gray scale, portions having great gray scale differences with respect to the surroundings are subjected to excessive contour correction (steepening), where by a contour is generated in portions which are originally free of contours. In order to prevent this, according to the present embodiment, the amount of contour correction is adjusted in accordance with the degree of changes in gray scale, rather than gray scale differences.

Figure 1:
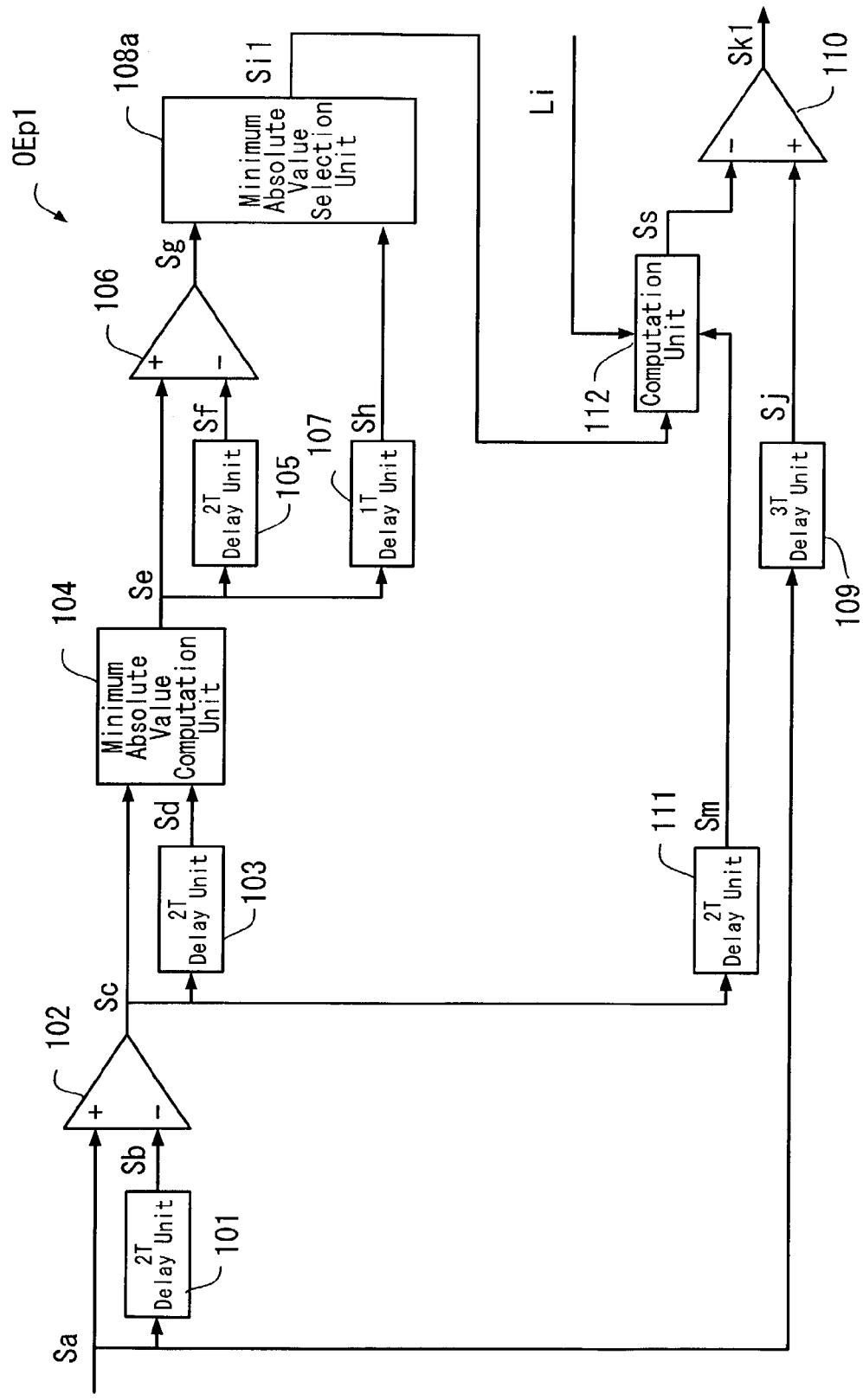
FIG. 1 is a block diagram illustrating a structure of a contour corrector according to a first embodiment of the present invention.

Referring to FIG. 1, a contour corrector according to a first embodiment of the present invention will be described. As shown in the figure, the contour corrector OEp1 includes a 2T delay unit 101, a subtraction unit 102, a 2T delay unit 103, a minimum absolute value computation unit 104, a 2T delay unit 105, subtraction unit 106, a 1T delay unit 107, a minimum absolute value selection unit 108, a 3T delay unit 109, a subtraction unit 110, a 2T delay unit 111, and a computation unit 112.

The 2T delay unit 101, which is coupled to an external video signal source (not shown), delays an inputted analog or digital input video signal Sa by a 2T period, thereby generating a 2T-delayed input video signal Sb. As used herein, the "T period" as in the "2T period" refers to N times a period GP, which corresponds to one pixel represented by the input video signal Sa (where N is a natural number). In other words, it can be represented as T=N, GP. Thus, a "T period" is a period corresponding to an arbitrary number N of pixels. In other words, a "2T period" is 2N pixel periods of the input video signal Sa. Preferably, in accordance with the frequency of the input video signal Sa, an optimum N value is determined. However, for conciseness of description, the case where N=1 will be described as a representative example in the present specification, unless indicated otherwise.

The subtraction unit 102 has a plus-side input port which is coupled to the aforementioned video signal source to receive the input video signal Sa, and a minus-side input port which is coupled to the 2T delay unit 101 to receive the 2T-delayed input video signal Sb. Then, the 2T-delayed input video signal Sb is, subtracted from the input video signal Sa, whereby a first primary differential signal Sc is generated.

The 2T delay unit 103, which is coupled to the subtraction unit 102, receives the first primary differential signal Sc. Furthermore, the 2T delay unit 103 delays the inputted first primary differential signal Sc by a 2T period, thereby generating a 2T-delayed primary differential signal Sd.

The minimum absolute value computation unit 104, which is coupled to the subtraction unit 102 and the 2T delay unit 103, receives the first primary differential signal Sc and the 2T-delayed primary differential signal Sd therefrom. Then, the minimum absolute value computation unit 104 finds a minimum value among the inputted first primary differential signal Sc and the 2T-delayed primary differential signal Sd, thereby generating a minimum primary differential signal Se.

The 2T delay unit 105 and the 1T delay unit 107, which are both coupled to the minimum absolute value computation unit 104, receive the minimum primary differential signal Se. Then, the inputted minimum primary differential signal Se is delayed by the 2T delay unit 105 by a 2T period, whereby a 2T-delayed minimum primary differential signal Sf is generated. Similarly, the minimum primary differential signal Se is delayed by the 1T delay unit 107 by a 1T period (1pixel period), whereby a 1T-delayed minimum primary differential signal Sh is generated.

The subtraction unit 106 has a plus-side input port which is coupled to the minimum absolute value computation unit 104 to receive the minimum primary differential signal Se, and a minus-side input port which is coupled to the 2T delay unit 105 to receive the 2T-delayed minimum primary differential signal Sf. The subtraction unit 106 subtracts the 2T-delayed minimum primary differential signal Sf from the inputted minimum primary differential signal Se, thereby generating a secondary differential signal Sg.

The minimum absolute value selection unit 108, which is coupled to the subtraction unit 106 and the 1T delay unit 107, receives the secondary differential signal Sg and the 1T-delayed minimum primary differential signal Sh therefrom. The minimum absolute value selection unit 108 finds a minimum value among the inputted secondary differential signal Sg and the 1T-delayed minimum primary differential signal Sh, thereby generating a first correction signal Si1.

The 3T delay unit 109, which is coupled to the aforementioned video signal source, receives the input video signal Sa. Then, the 3T delay unit 109 delays the inputted secondary differential signal Sg by a 3T period, thereby generating a 3T-delayed input video signal Sj.

The 2T delay unit 111, which is coupled to the subtraction unit 102, receives the first primary differential signal Sc. Then, the 2T delay unit 111 delays the first primary differential signal Sc by a 2T period, thereby generating a second delayed primary differential signal Sm. The 2T-delayed primary differential signal Sd is equivalent to the second delayed primary differential signal Sm. Therefore, the 2T delay unit 111 may be eliminated, and the first delayed primary differential signal d may be inputted to the computation unit 112, instead of the second delayed primary differential signal Sm.

The computation unit 112, which is coupled to the minimum absolute value selection unit 108 and the 2T delay unit 111, receives a first correction signal Si1, the second delayed primary differential signal Sm therefrom, and gray-scale information Li. The computation unit 112 is primarily an adjusting unit of the first correction signal Si1 which performs a predetermined computation for the first correction signal Si1 and the second delayed primary differential signal Sm to generate a second correction signal Ss. In other words, the computation unit 112 and the 2T delay unit 111 realize an adaptive correction function, which is a fundamental concept of the present embodiment, of adaptively adjusting the amount of contour correction in accordance with the degree of changes in gray scale, rather than gray scale differences.

Furthermore, the computation unit 112 is coupled to an externally provided video signal gray scale instruction unit (not shown) to receive the gray-scale information Li representing the gray scale level of the input video signal Sa. Then, based on the gray-scale information Li, it changes the content of the computation for the first correction signal Si1 and the second delayed primary differential signal Sm, thereby generating the further-adjusted second correction signal Ss.

The subtraction circuit 10 has a plus-side input port which is coupled to the 3T delay unit 109 to receive the 3T-delayed input video signal Sj, and a minus-side input port which is coupled to the computation unit 112 to receive the second correction signal Ss. The subtraction circuit 10 subtracts the second correction signal Ss from the inputted 3T-delayed input video signal Sj, thereby obtaining a first output video signal Sk1. Thus, by subtracting the second correction signal Ss from the 3T-delayed input video signal Sj in the subtraction unit 110, the first output video signal Sk1, which is the input video signal Sa having its contour corrected, is generated. In this sense, the computation unit 112 has a function of adjusting the contour state of the first output video signal Sk1 in terms of two elements, i.e., the second delayed primary differential signal Sm and the gray-scale information Li.

Hereinafter, the operation of the contour corrector OEp1 structured as above will be specifically described. By delaying the input video signal Sa in the delay unit 1, the 2T-delayed input video signal Sb, which is the input video signal Sa having been delayed by a 2T period (2 pixel periods), is obtained. By subtracting the 2T-delayed input video signal Sb from the input video signal Sa in the subtraction unit 102, the first primary differential signal Sc is obtained.

Next, after obtaining in the 2T delay unit 103 the 2T-delayed primary differential signal Sd, which is the first primary differential signal Sc having been delayed by a 2T period, one of the first primary differential signal Sc and the 2T-delayed primary differential signal Sd that has a smaller absolute value is selected by the minimum absolute value computation unit 104, whereby the minimum primary differential signal Se is obtained. However, if the sign of the first primary differential signal Sc is different from the sign of the 2T-delayed primary differential signal Sd, "0" is outputted. Note that sign of the first primary differential signal Sc is employed as the sign. The minimum primary differential signal Se thus obtained will always be within a rise or fall period of a contour portion of the input video signal Sa.

Next, by means of the 2T delay unit 105 and the 1T delay unit 107, the 2T-delayed minimum primary differential signal Sf and the 1T-delayed minimum primary differential signal Sh, which are the minimum primary differential signal Se having been delayed by a 2T period and a 1T period, respectively, are obtained.

Next, in the subtraction unit 106, the 2T-delayed minimum primary differential signal Sf is subtracted from the minimum primary differential signal Se, whereby the secondary differential signal Sg is obtained. In the minimum absolute value selection unit 108, one of the secondary differential signal Sg and the 1T-delayed minimum primary differential signal Sh that has a smaller absolute value is selected, whereby the first correction signal Si1 is obtained. The same sign as that of the secondary differential signal Sg is employed as its sign.

The 2T delay unit 111 delays the first primary differential signal Sc by a 2T period, thereby obtaining the second delayed primary differential signal Sm. The second delayed primary differential signal Sm is delayed with respect to the input video signal Sa by a 3T period.

As described above, the first correction signal Si1 is subjected by the computation unit 112 to a predetermined computation based on the second delayed primary differential signal Sm and the gray-scale information Li, whereby the second correction signal Ss is generated.

Thus, in this sense, according to the present embodiment, A relationship represented by the following equations (1) to (9) holds between the first correction signal Si1, the second correction signal Ss, the second delayed primary differential signal Sm, and the gray-scale information Li.

$$Ss = f(Si1, Sm, Li) \quad (1)$$

$$Ss = f(Si1, Li) \times f(Sm, Li) \quad (2)$$

From the above equations, as a preferable example of the case where the input video signal Sa has 256 gray scale levels (Li=256), the second correction signal Ss is represented as a two-part line graph. In other words, the second correction signal Ss takes a value defined by the following equations (3) and (4), depending on the value of the second delayed primary differential signal Sm.

$$Ss = Si1 \times Sm/16 \, (Sm <= 16) \quad (3)$$

$$Ss = Si1 \, (Sm > 16) \quad (4)$$

Although the above equations (3) and (4) illustrate an example where the threshold value of the second delayed primary differential signal Sm is "16", depending on the desired contour correction result, it may be set to be any appropriate value other than "16", such as "32" or "24".

As defined by the following equations (5), (6), and (7), the second correction signal Ss may be set so as to be represented as a three-part line graph.

$$Ss=Si1\times Sm/32(Sm\leq=16) \quad (5)$$

$$Ss=Si1/2+Si1*(Sm-16)/64(Sm>16, Sm<=48) \quad (6)$$

$$Ss=Si1(Sm>48) \quad (7)$$

Functions and threshold values which are defined for the values of the gray-scale information Li exemplified by the above equations (1) to (7) are stored as a table in the computation unit 112. The computation unit 112 performs a predetermined computation while referring to the internally-stored table based on the gray-scale information Li, thereby adjusting the first correction signal Si1 with the second delayed primary differential signal Sm to generate the second correction signal Ss.

As an example where the gray-scale information Li has a different value, in the case where the input video signal Sa has 1024 gray scale levels, the next equations (8) and (9) are obtained.

$$Ss=Si1\times Sm/64(Sm\leq 64) \quad (8)$$

$$Ss=Si1(Sm>64) \quad (9)$$

This Ss is outputted as the second correction signal Ss to the subtraction unit 110.

Next, by subtracting by means of the subtraction unit 110 the second correction signal Ss from the 3T-delayed input video signal Sj, which is the input video signal Sa having been delayed by a 3T period, the first output video signal Sk1 is obtained. In the case of a video signal which smoothly undergoes a monotonous increase or monotonous decrease, e.g., gradation, the gain of the first output video signal Sk1 is determined as a function of the primary differential value (Sm) as represented by the above equation(2); therefore, the first output video signal Sk1 becomes small, so that the characteristics of the original input video signal Sa are not degraded. As for a steep contour portion, the first output video signal Sk1 will always be within the rise or fall period of the contour portion of the input video signal Sa, as in the output video signal k of the conventional example contour corrector GEc, so that it is possible to perform contour correction without preshoot or overshoot.

The function equations (1) to (9) and the threshold values for the aforementioned values of gray-scale information Li are exemplary. Depending on the characteristics of the input video signal Sa and the characteristics of the display which displays the first output video signal Sk1 after correction, they can be set appropriately, through experimentation and the like, so that an optimum contour correction result can be obtained.

Figure 3:
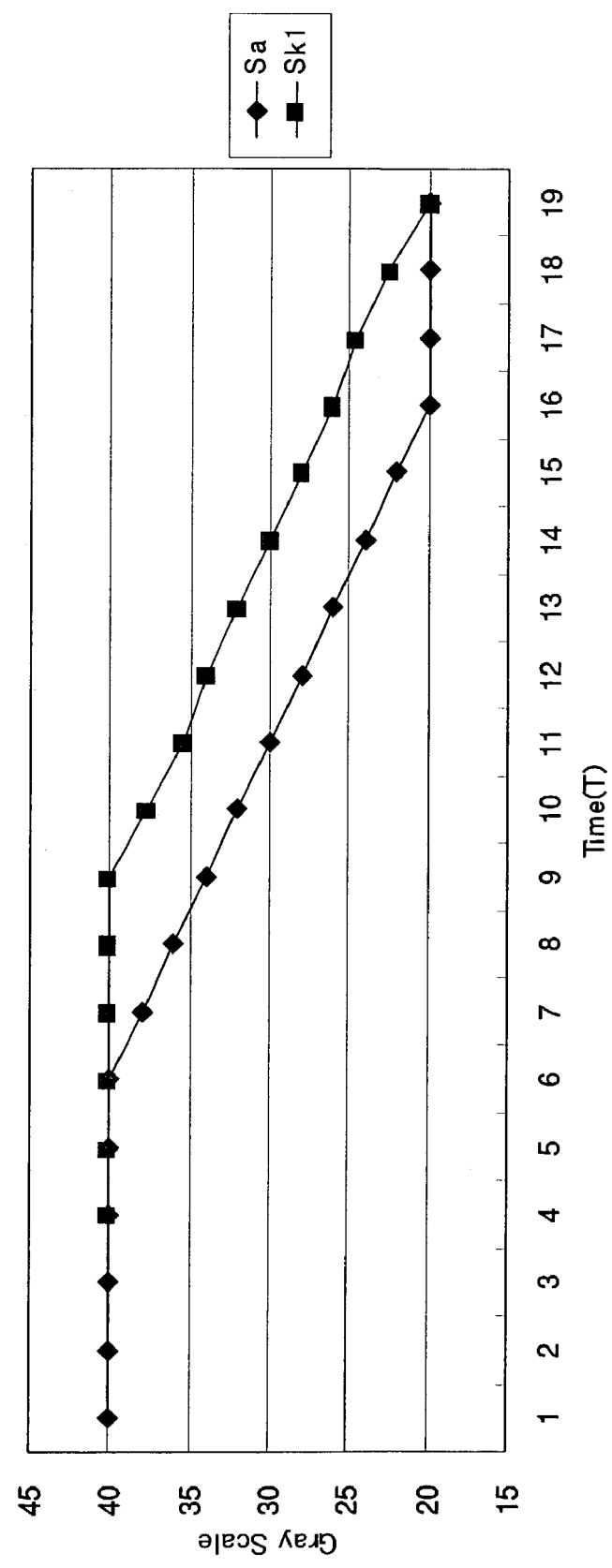
FIG. 3 is a diagram comparatively illustrating an input video signal and an output video signal of the contour corrector shown in FIG. 1.
Figure 5:
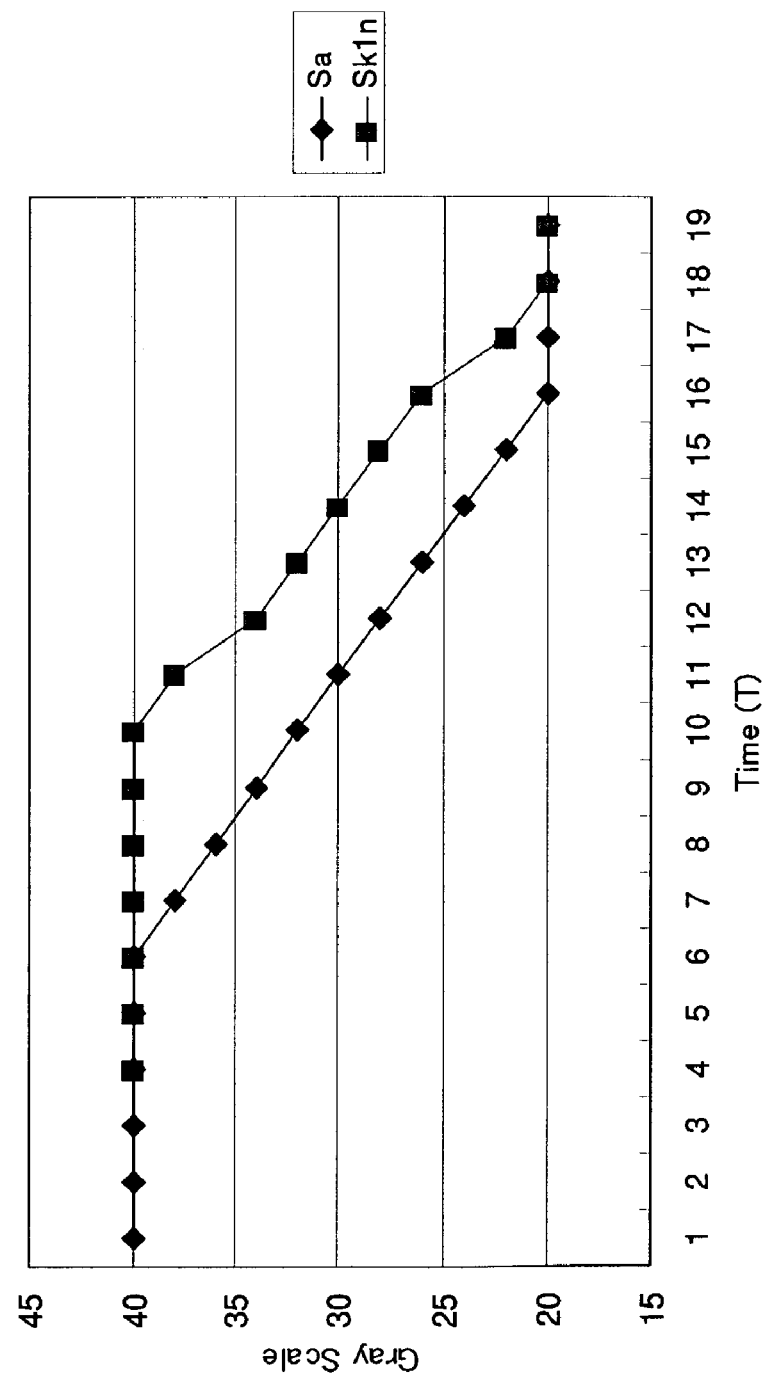
FIG. 5 is a diagram comparatively illustrating an input video signal and an output video signal of the contour corrector in a state as shown in FIG. 4.

Next, referring to FIG. 2, FIG. 3, FIG. 4, and FIG. 5, a contour correction process by the contour corrector OEp1 according to the present embodiment will be specifically described with respect to a signal which is obtained by digital-sampling the input video signal Sa. FIG. 2 and FIG. 3 illustrate signal values and signal waveforms processed by the contour corrector OEp1 according to the present embodiment. FIG. 4 and FIG. 5 illustrate signal values and signal waveforms in the case where the 2T delay unit 111 and the computation unit 112 which provide the adaptive correction function are eliminated from the contour corrector OEp1, such that Sj−Si, which is a result of subtracting the first correction signal Si1 from the 3T-delayed input video signal Sj in the subtraction unit 110, is outputted as a first output video signal Sk1n.

In FIG. 2, the symbols shown in the leftmost column, Sa, Sb, Sc, Sd, Se, Sf, Sg, Sh, Si, Sm, Ss, Sj, and Sk1 respectively represent the aforementioned input video signal Sa, 2T-delayed input video signal Sb, first primary differential signal Sc, 2T-delayed primary differential signal Sd, minimum primary differential signal Se, 2T-delayed minimum primary differential signal Sf, secondary differential signal Sg, 1T-delayed minimum primary differential signal Sh, first correction signal Si1, second delayed primary differential signal Sm, second correction signal Ss, 3T-delayed input video signal Sj, and first output video signal Sk1 which are observed in various sections of the contour corrector OEp1. The topmost row shows lapses of time, represented as multiples of a period T, since the input video signal Sa is inputted to the contour corrector OEp1. The times represented as multiples of the period T are respectively referred to as "times n×T" (where n is a natural number). The respective rows for the aforementioned signals, including a sign, each show a value of the corresponding signal at each time.

FIG. 3 is a graph showing changes in the input video signal Sa and the first output video signal Sk1 shown in FIG. 2, taken along a time axis (horizontal axis) and a gray scale axis (vertical axis).

FIG. 4 is similar to FIG. 2, except that the second delayed primary differential signal Sm and the second correction signal Ss are omitted, and that the signal values of the first output video signal Sk1n, instead of the first output video signal Sk1, are shown. FIG. 5 is a graph representing the changes in the input video signal Sa and the first output video signal Sk1n shown in FIG. 4.

Comparing FIG. 3 against FIG. 5, it can be seen that the amplitude of the slope is controlled to be almost constant in FIG. 3, although the amplitude of the slope is not constant in FIG. 5. This indicates that correction for a gradation signal which undergoes a monotonous increase or decrease with a small amplitude is suppressed so that the characteristics of the original video signal are retained. Thus, the effects of the adaptive correction function in accordance with the degree of changes in gray scale, as realized by the 2T delay unit 111 and the computation unit 112 according to the present invention, should be clear.

(Second Embodiment)

Figure 21:
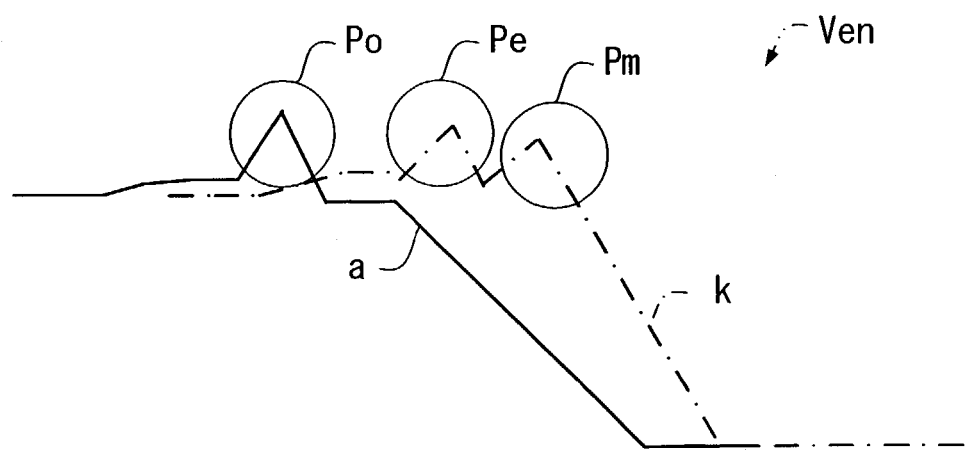
FIG. 21 is an explanatory diagram representing a contour correction result by the contour corrector shown in FIG. 18 of a video signal having a peak near the contour portion.

First, the fundamental concept of the contour corrector according to the present embodiment will be described prior to specific descriptions referring to the figures. The contour corrector OEp2 according to the present embodiment solves the specific problem of the contour corrector OEc, i.e., inability of the contour corrector OEc, as described with reference to FIG. 21, to perform a proper contour correction for a waveform signal having peaks near a contour portion.

Figure 6:
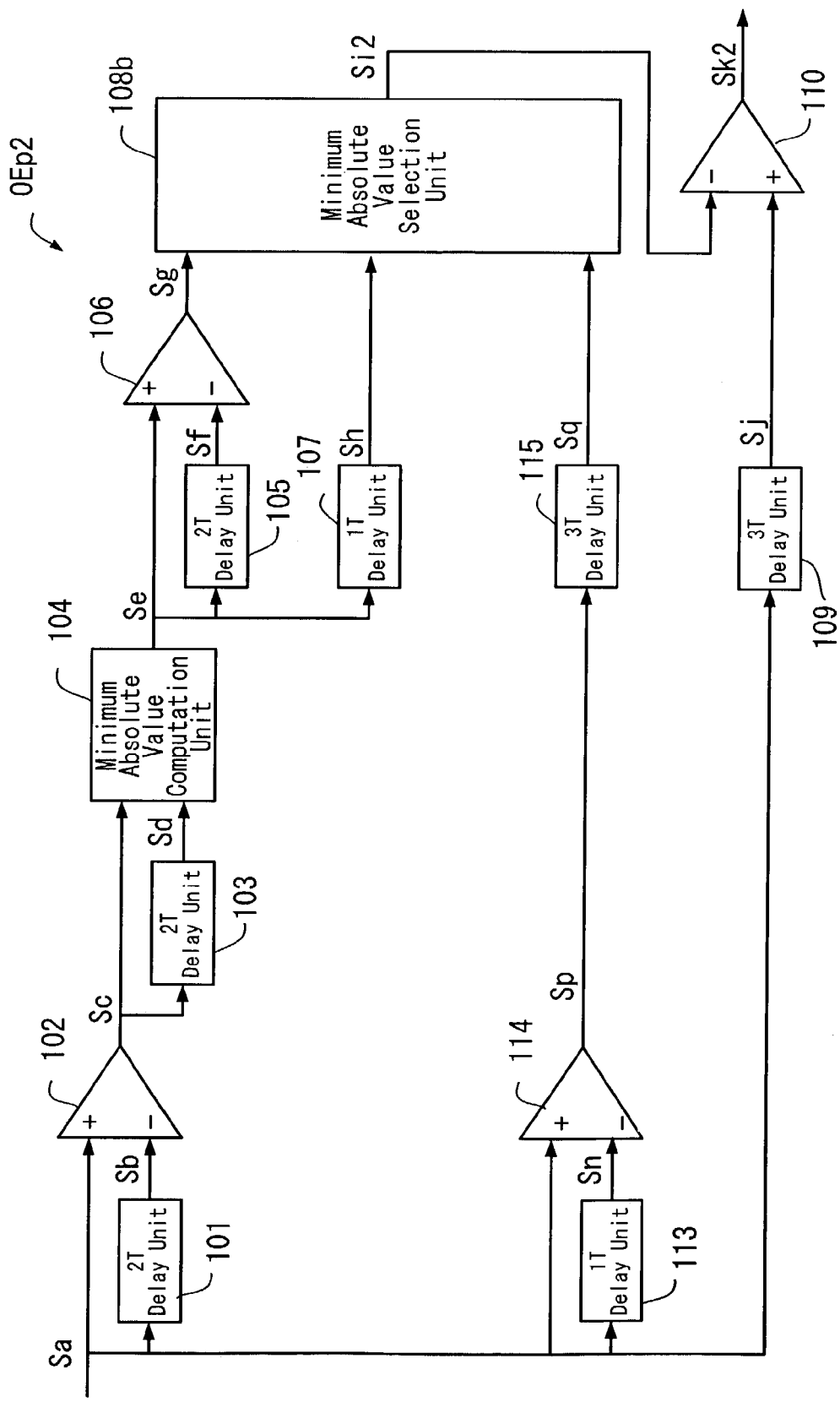
FIG. 6 is a block diagram illustrating a structure of a contour corrector according to a second embodiment of the present invention.

As shown in FIG. 6, the contour corrector OEp2 according to the present embodiment is constructed by replacing the minimum absolute value selection unit 108a with a minimum absolute value selection unit 108b, eliminating the 2T delay unit 111 and the computation unit 112, and newly adding a 1T delay unit 113, a subtraction unit 114, and a 3T delay circuit 115 in the contour corrector OEp1 shown in FIG. 1. The newly-provided 1T delay unit 113, subtraction unit 114, and 3T delay circuit 115 provide in the contour corrector a deformation suppression function of suppressing any contour correction process that would deform the waveform of an input video signal Sa.

Specifically, an input video signal Sa which is inputted from a video signal source is subjected to processing by the subtraction unit 102, the subtraction unit 102, the 2T delay unit 103, the minimum absolute value computation unit 104, the 2T delay unit 105, the subtraction unit 106, and the 1T delay unit 107, similar to that in the contour corrector OEp1, whereby a secondary differential signal Sg and a 1T-delayed minimum primary differential signal Sh are outputted from the subtraction unit 106 and the 1T delay unit 107, respectively, to the minimum absolute value selection unit 108b.

The 1T delay unit 113 which is newly provided in the contour corrector OEp2 is coupled to the video signal source to receive the input video signal Sa. The 1T delay unit 113 delays the input video signal Sa by a 1T period, thereby generating a 1T-delayed input video signal Sn.

As does the subtraction unit 102, the subtraction unit 114 has a plus-side input port which is coupled to the aforementioned video signal source to receive the input video signal Sa, and a minus-side input port which is coupled to the 1T delay unit 113 to receive the 1T-delayed input video signal Sn. The subtraction unit 114 subtracts the 1T-delayed input video signal Sn from the input video signal Sa, thereby generating a second primary differential signal Sp. The 3T delay circuit 115 is coupled to the subtraction unit 114 to receive the second primary differential signal Sp. The 3T delay circuit 115 delays the second primary differential signal Sp by a 3T period, thereby generating a second delayed primary differential signal Sq, which is outputted to the minimum absolute value selection unit 108b.

The minimum absolute value selection unit 108b finds a minimum value among the secondary differential signal Sg inputted from the subtraction unit 106, the 1T-delayed minimum primary differential signal Sh inputted from the 1T delay unit 107, and the second delayed primary differential signal Sq inputted from the 3T delay circuit 115, thereby generating a first correction signal Si2. Whereas the minimum absolute value selection unit 108a according to the first embodiment takes a minimum value among two input signals (the secondary differential signal Sg and the 1T-delayed minimum primary differential signal Sh), the minimum absolute value selection unit 108b differs in that a minimum value among three input signals (the secondary differential signal Sg, the 1T-delayed minimum primary differential signal Sh, and the second delayed primary differential signal Sq) is taken. Naturally, the values which may be taken by the first correction signal Si1 outputted from the minimum absolute value selection unit 108a and the values which may be taken by the first correction signal Si2 outputted from the minimum absolute value selection unit 108b are different.

The contour correction operation of the contour corrector OEp2 structured as above will be described. The operation from the 2T delay unit 101 to the minimum absolute value selection unit 108b is the same as the operation of the already-described contour corrector OEp1, and the descriptions thereof are omitted.

The 1T delay unit 113 delays the input video signal Sa by a 1T period, whereby the 1T-delayed input video signal Sn is obtained. The 1T-delayed input video signal Sn is subtracted from the input video signal Sa in the subtraction unit 114, whereby the second primary differential signal Sp is obtained. The 3T delay circuit 115 obtains the second delayed primary differential signal Sq, which is the second primary differential signal Sp having been delayed by a 3T period. In the minimum absolute value selection unit 108, one of the secondary differential signal Sg, the 1T-delayed minimum primary differential signal Sh, and the second delayed primary differential signal Sq that has a smallest absolute value is selected, whereby the first correction signal Si2 is obtained. The same sign as that of the secondary differential signal Sg is employed as its sign.

Next, by subtracting by means of the subtraction unit 110 the first correction signal Si2 from the 3T-delayed input video signal Sj, which is the input video signal Sa having been delayed by a 3T period, the first correction signal Si2 is obtained. As is the case with the output video signal k of the aforementioned contour corrector OEc, and the first output video signal Sk1 of the contour corrector OEp1, the first correction signal Si2 will always be within the rise or fall period of the contour portion of the input video signal Sa(a), so that it is possible to perform contour correction without preshoot or overshoot. Furthermore, the problem of the output video signal having different characteristics from the characteristics (increase/decrease pattern)of the input video signal, for a given video signal pattern, is solved.

Next, with reference to FIG. 7, FIG. 8, FIG. 9, FIG. 10, FIG. 11, and FIG. 12, a contour correction process by the contour corrector OEp2 according to the present embodiment will be specifically described with respect to a signal which is obtained by digital-sampling the input video signal Sa.

Figure 8:
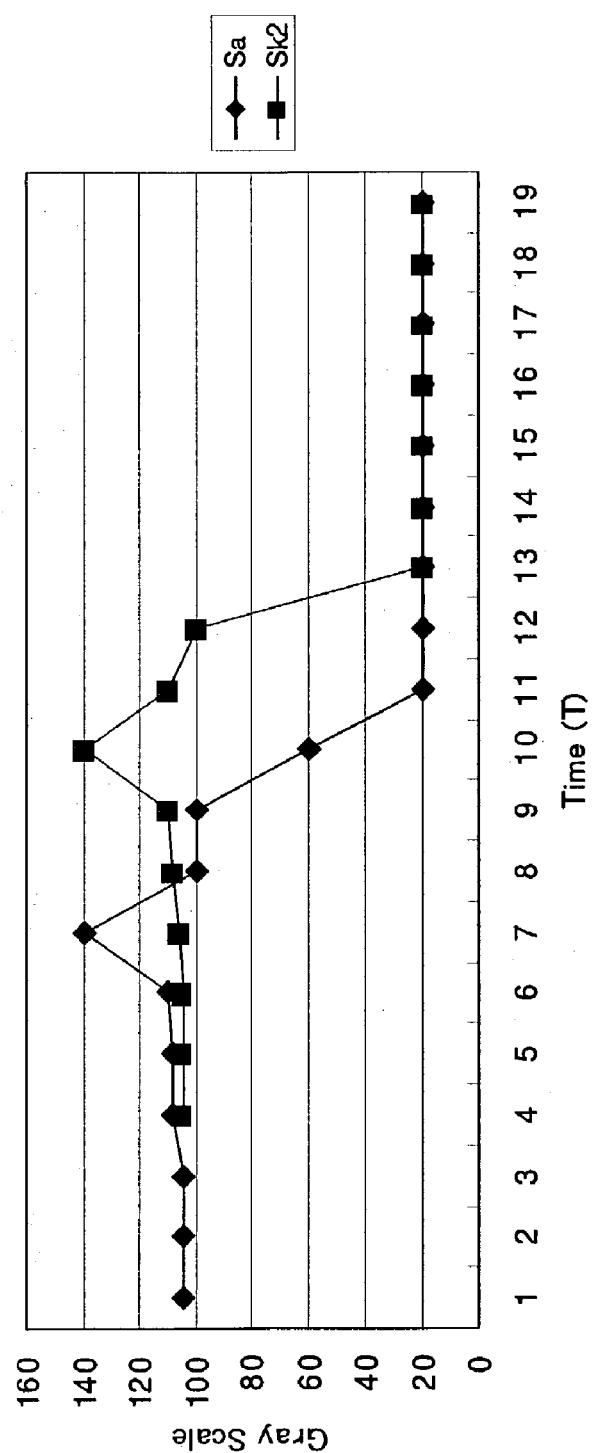
FIG. 8 is a diagram comparatively illustrating an input video signal and an output video signal of the contour corrector shown in FIG. 6.
Figure 10:
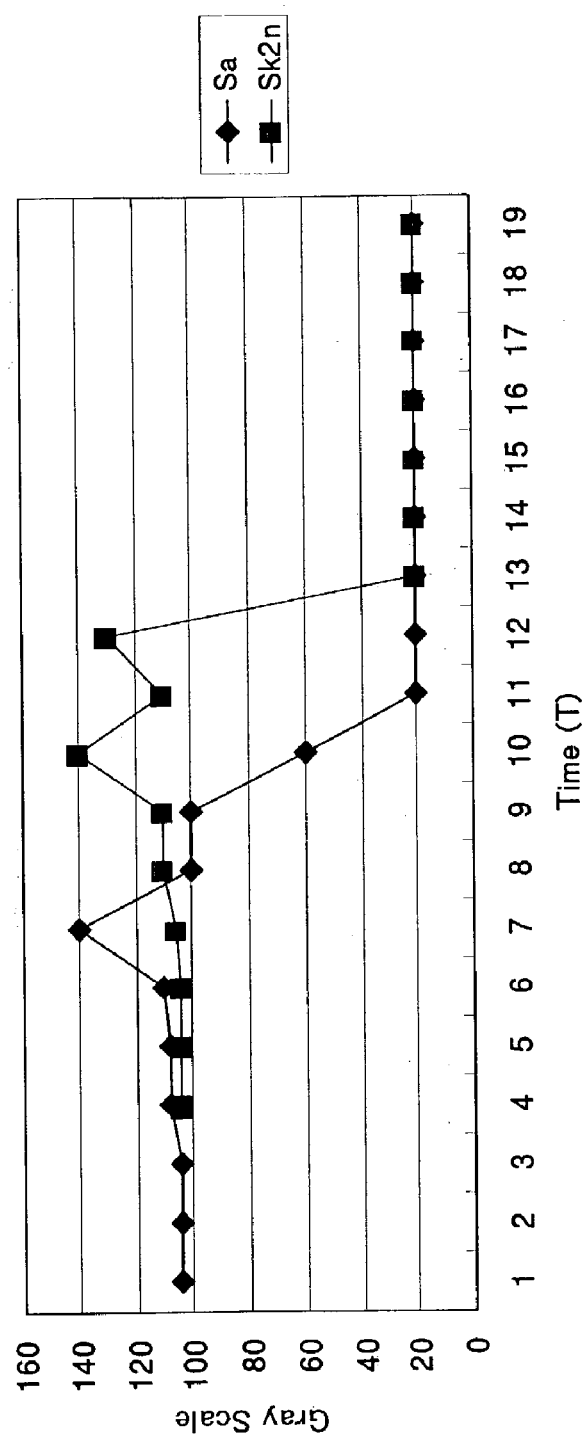
FIG. 10 is a diagram comparatively illustrating an input video signal and an output video signal of the contour corrector in a state as shown in FIG. 9.

FIG. 7 and FIG. 8 illustrate signal values and signal waveforms processed by the contour corrector OEp2 according to the present embodiment. FIG. 9 and FIG. 10 illustrate the process in the case where the 1T delay unit 113, the subtraction unit 114, and the 3T delay circuit 115 are eliminated from the contour corrector OEp2. In this case, since the second delayed primary differential signal Sq is not inputted to the minimum absolute value selection unit 108b, the first correction signal Si1 is outputted from the minimum absolute value selection unit 108b to the subtraction unit 110, instead of the first correction signal Si2. As a result, in the subtraction unit 110, the first correction signal Si1 is subtracted from the 3T-delayed input video signal Sj, which is the input video signal Sa having been delayed by a 3T period, whereby the first correction signal Si2n is generated. FIG. 9 and FIG. 10 illustrate the signal values and signal waveforms in this case.

Comparing FIG. 8 against FIG. 10, it is seen that while the first correction signal Si2n in FIG. 10 has two peaks of increase and decrease, these are minimized to be one peak of increase and decrease in the first correction signal Si2 in FIG. 8, as in the input video signal Sa. Thus, it is indicated that the problem of degradation of the characteristics of the input video signal Sa is solved according to the present embodiment. Thus, the effects of the deformation suppression function of suppressing any contour correction that would deform the waveform of the input video signal Sa, as provided by the 1T delay unit 113, the subtraction unit 114, and the 3T delay circuit 115, should be clear.

Figure 12:
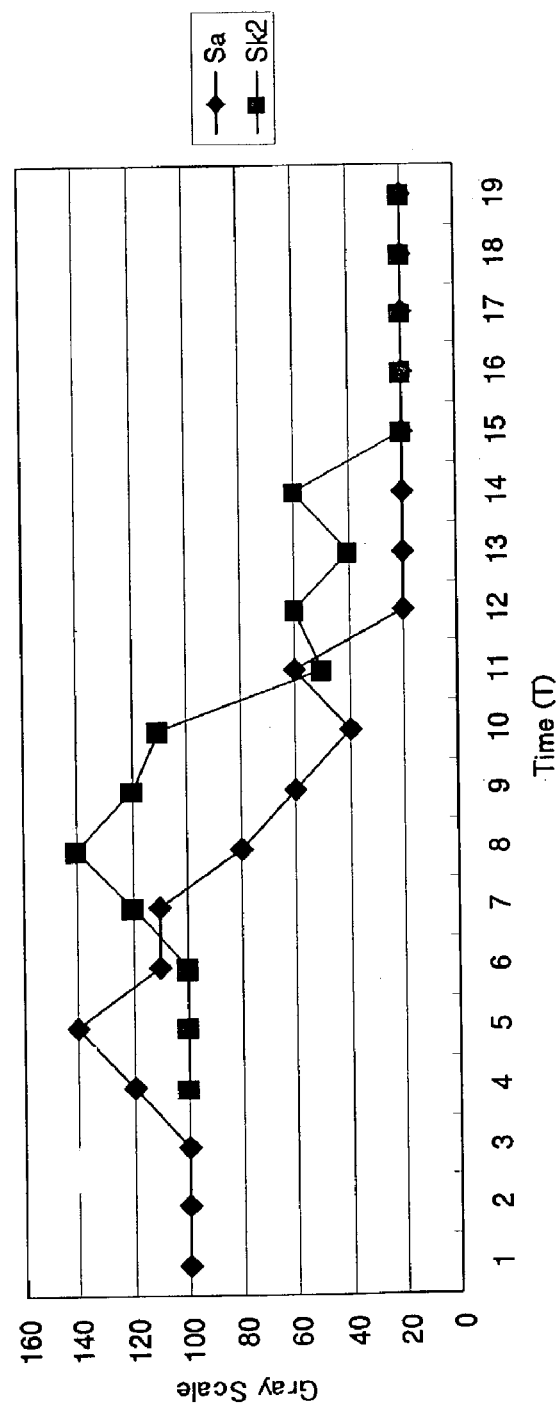
FIG. 12 is a diagram comparatively illustrating an input video signal and an output video signal of the contour corrector in a state as shown in FIG. 11.

Next, referring to FIG. 11 and FIG. 12, a problem which is yet to be solved by the contour corrector OEp2 according to the present embodiment will be described.

FIG. 11 illustrates values of respective signals in the contour corrector OEp2, as in FIG. 7. In FIG. 11 and FIG. 12, however, if an input video signal Sa which is discontinuous in gray scale (as notable at time T11) is inputted, two peaks in the first output video signal Sk2 at time T12 and T14 may be generated for what is originally one peak of increase/decrease at time T11, as shown in FIG. 12. In order to solve this problem, a contour corrector according to a third embodiment of the present invention is proposed below.

(Third Embodiment)

Figure 13:
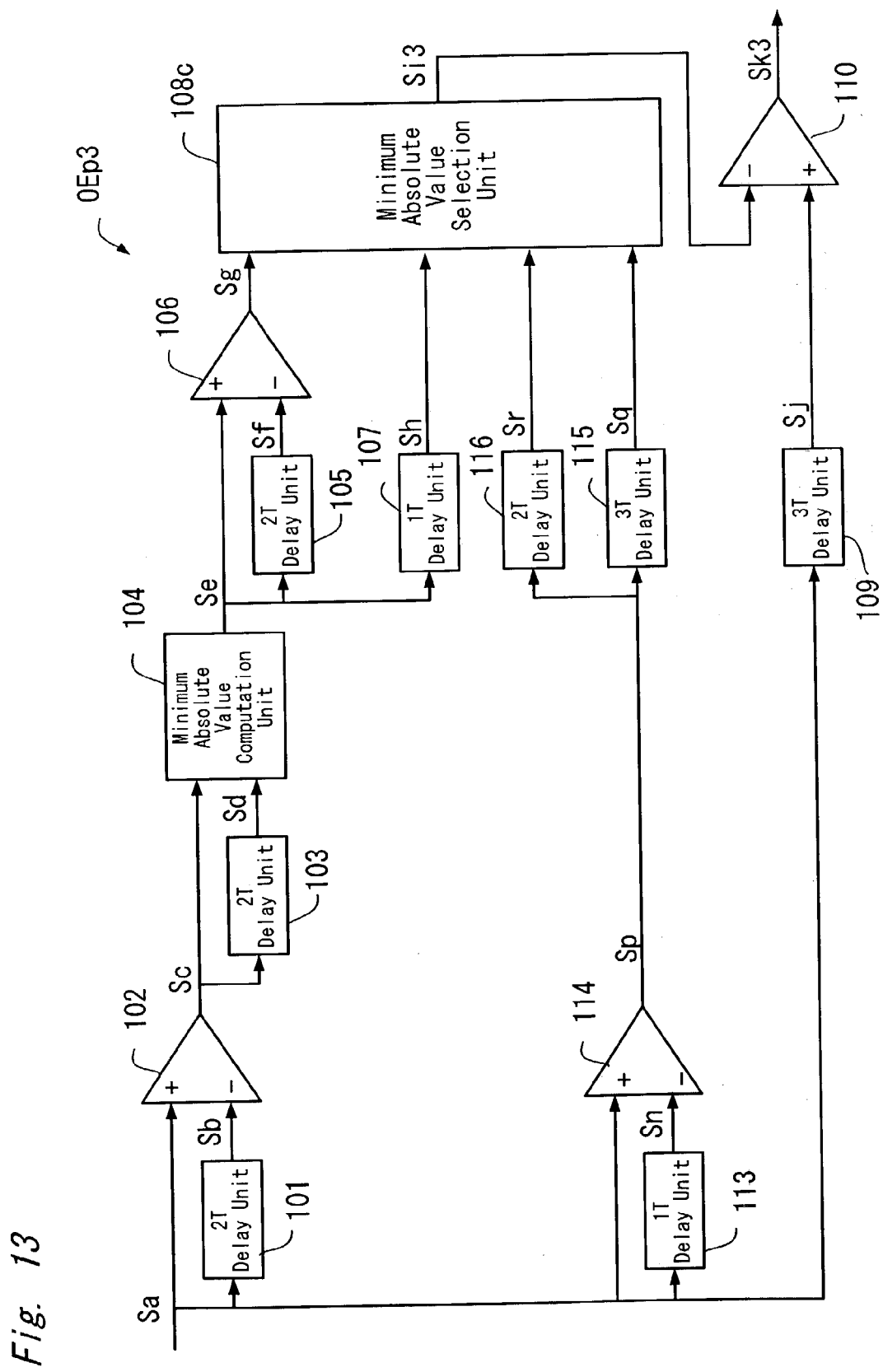
FIG. 13 is a block diagram illustrating a structure of a contour corrector according to a third embodiment of the present invention.

Referring to FIG. 13, a contour corrector according to a third embodiment of the present invention will be described. The contour corrector OEp3 according to the present embodiment newly includes a 2T delay unit 116, in parallel to the 3T delay circuit 115 of the contour corrector OEp2 shown in FIG. 6. The minimum absolute value selection unit 108b is replaced by a minimum absolute value selection unit 108c.

That is, the 2T delay unit 116 is coupled to the subtraction unit 114 to receive a second primary differential signal Sp. Then, the 2T delay unit 116 delays the second primary differential signal Sp by a 2T period, thereby generating a 2T-delayed primary differential signal Sr, which is outputted to the minimum absolute value selection unit 108c. As a result, the minimum absolute value selection unit 108c receives three signals, i.e., the 1T-delayed minimum primary differential signal Sh, the second delayed primary differential signal Sq, and the 2T-delayed primary differential signal Sr, generates a first correction signal Si3 by selecting a minimum value among these three signals, and outputs it to the subtraction unit 110.

While the minimum absolute value selection unit 108b according to the second embodiment takes a minimum value among the three input signals (the secondary differential signal Sg, the 1T-delayed minimum primary differential signal Sh, and the second delayed primary differential signal Sq), the minimum absolute value selection unit 108c differs in that it takes a minimum value among four input signals (the secondary differential signal Sg, the 1T-delayed minimum primary differential signal Sh, the second delayed primary differential signal Sq, and the 2T-delayed primary differential signal Sr). Naturally, the values which may be taken by the first correction signal Si3 outputted from the minimum absolute value selection unit 108c and the values which may be taken by the first correction signal Si2 outputted from the minimum absolute value selection unit 108b are different.

A contour correction operation of the contour corrector OEp3 structured as above will be specifically described. It is identical to the operation of the contour corrector OEp2 except for, as described above, the generation of the 2T-delayed primary differential signal Sr in the 2T delay unit 116, the generation of the first correction signal Si3 in the minimum absolute value selection unit 108c, and the generation of the first output video signal Sk3 in the subtraction unit 110 by subtracting the first correction signal Si3 from the 3T-delayed input video signal Sj.

In the delay unit 116, the 2T-delayed primary differential signal Sr, which is the second primary differential signal Sp having been delayed by a 2T period, is obtained. The minimum absolute value selection unit 108 selects one of the secondary differential signal Sg, the 1T-delayed minimum primary differential signal Sh, the second delayed primary differential signal Sq, and the 2T-delayed primary differential signal Sr that has a smallest absolute value, whereby the first correction signal Si3 is obtained. The same sign as that of the secondary differential signal Sg is employed as the sign of the first correction signal Si3.

Next, the first correction signal Si3 is subtracted by means of the subtraction unit 110 from the 3T-delayed input video signal Sj, which is the input video signal Sa having been delayed by a 3T period, whereby the first output video signal Sk3 is obtained. Since the first output video signal Sk3 will always be within the rise or fall period of the contour portion of the input video signal Sa, it is possible to perform contour correction without preshoot or overshoot.

Furthermore, the problem of the output video signal having different characteristics from the characteristics (increase/decrease pattern) of the input video signal for a pattern of the input video signal Sa is solved. By providing the 2T-delayed primary differential signal Sr in addition to the second delayed primary differential signal Sq, it becomes possible to better retain the characteristics of the input video signal for a video signal pattern.

Figure 15:
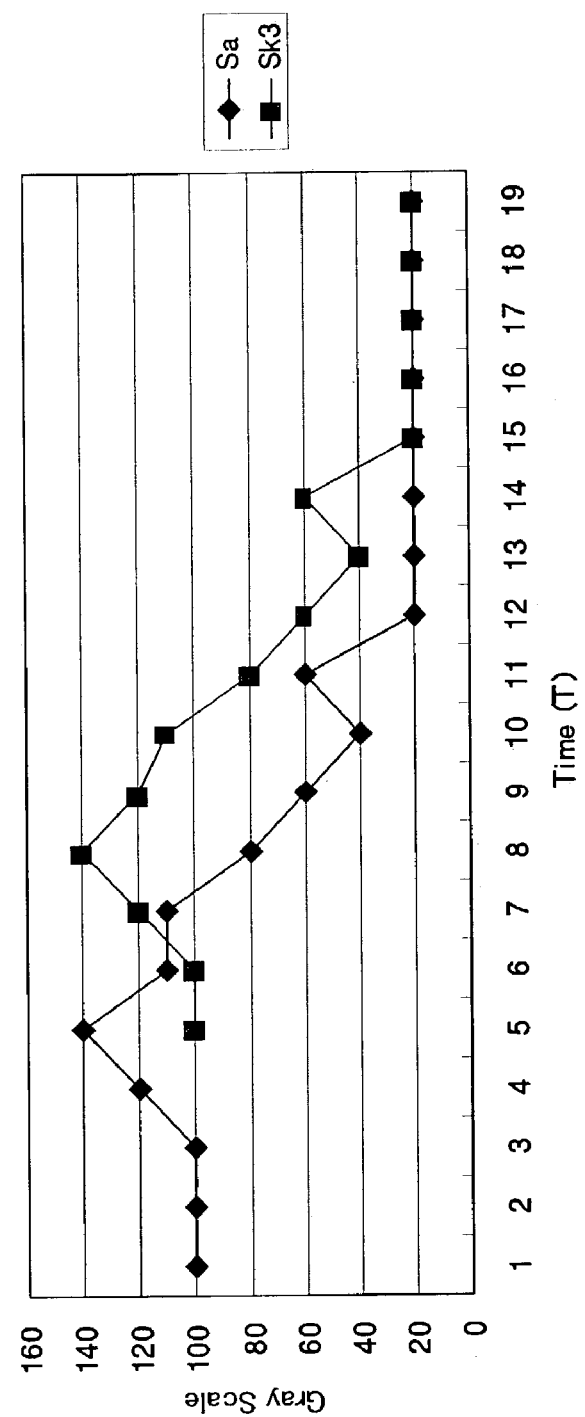
FIG. 15 is a diagram comparatively illustrating an input video signal and an output video signal of the contour corrector shown in FIG. 13.

Next, with reference to FIG. 14 and FIG. 15, the result of performing the contour correction process according to the present embodiment for a digital-sampled input video signal Sa. Comparing FIG. 15 against FIG. 12 as described above, it is seen that while the output video signal Sk in FIG. 12 has two peaks of increase and decrease, these are minimized to be one peak of increase and decrease in the output video signal Sk in FIG. 7, as in the input video signal Sa. Thus, according to the present embodiment, the problem of degradation of video signal characteristics is solved even better.

(Fourth Embodiment)

Figure 16:
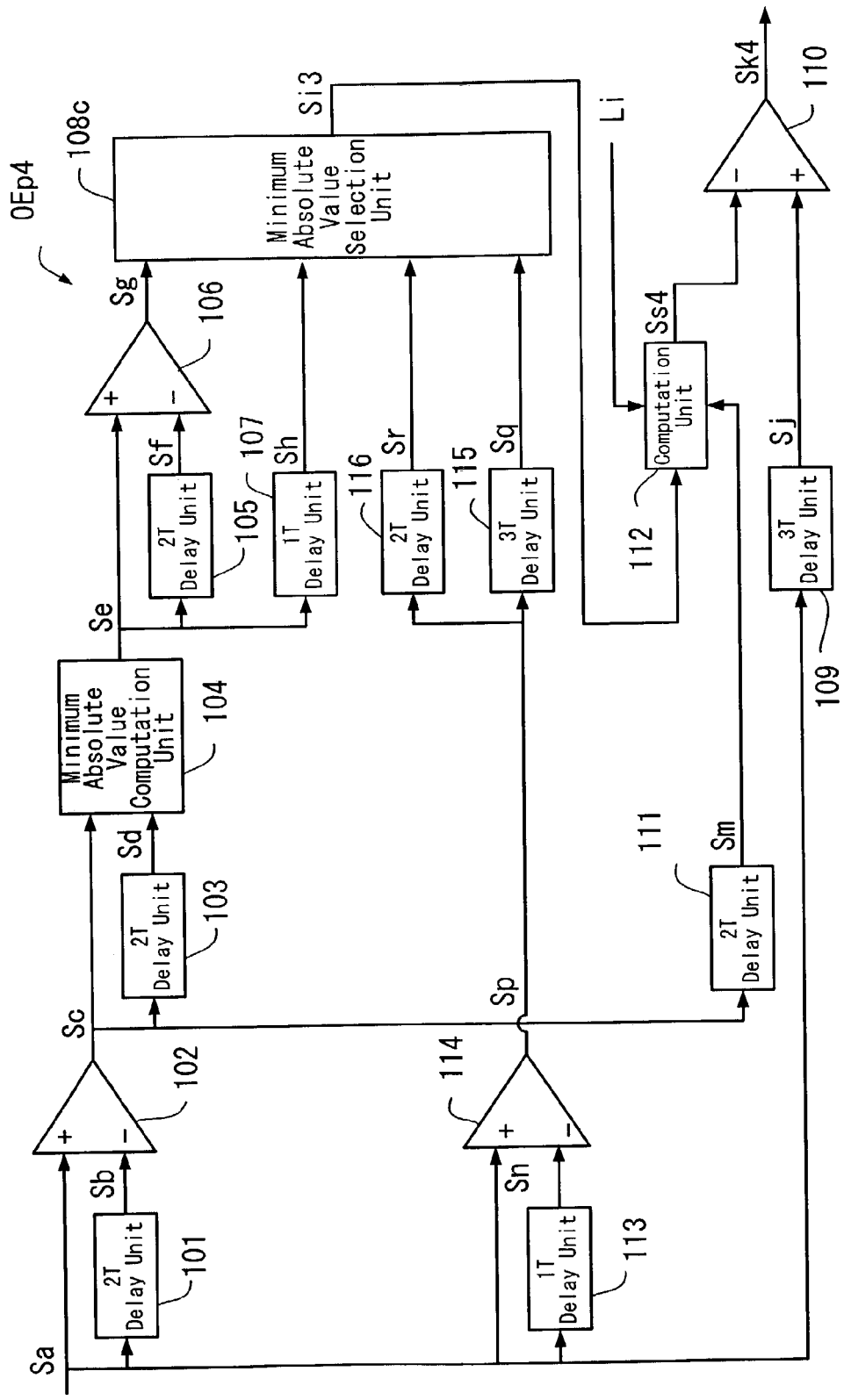
FIG. 16 is a block diagram illustrating a structure of a contour corrector according to a fourth embodiment of the present invention.
Figure 17:
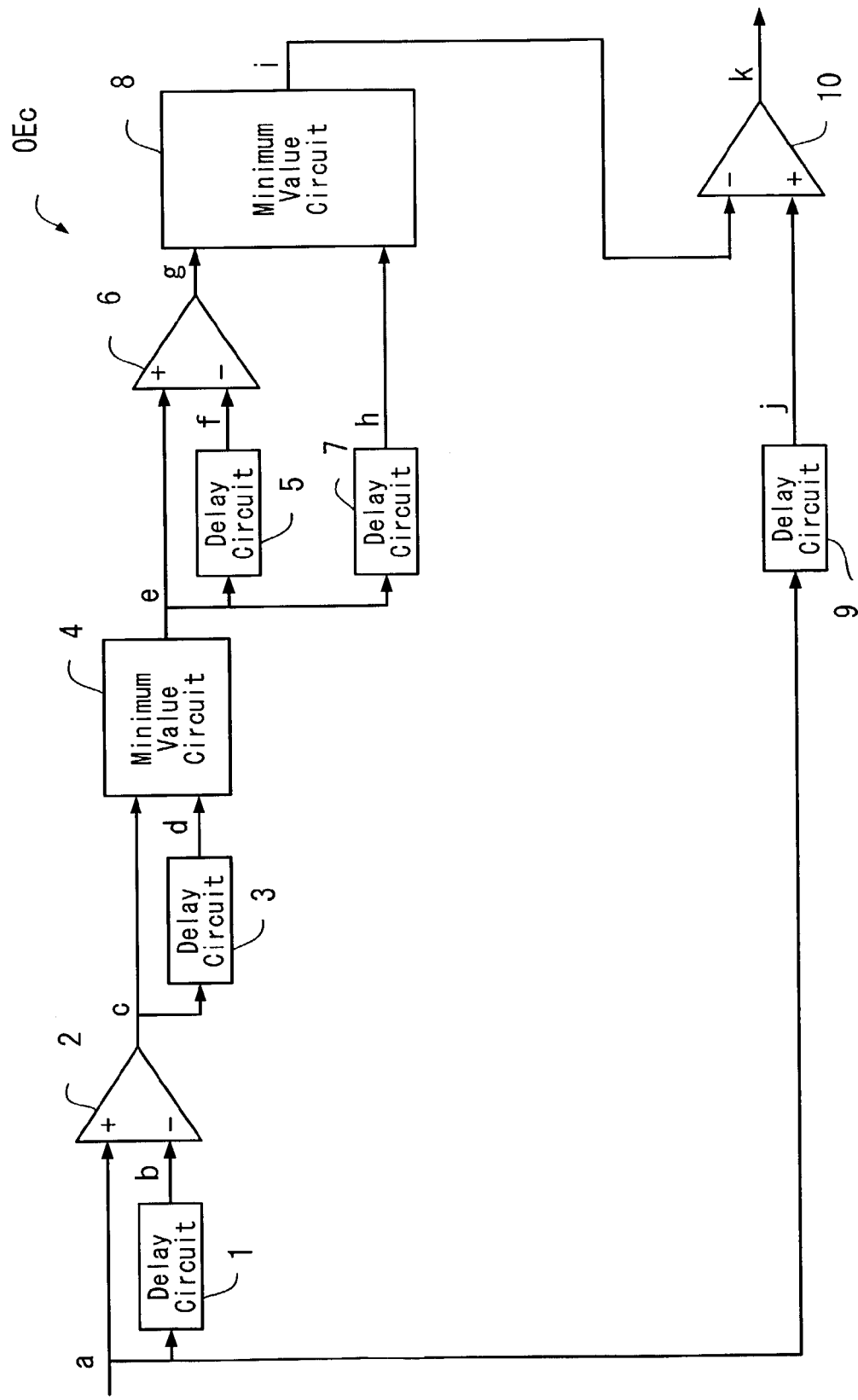
FIG. 17 is a block diagram illustrating the structure of a conventional contour corrector.
Figure 18:
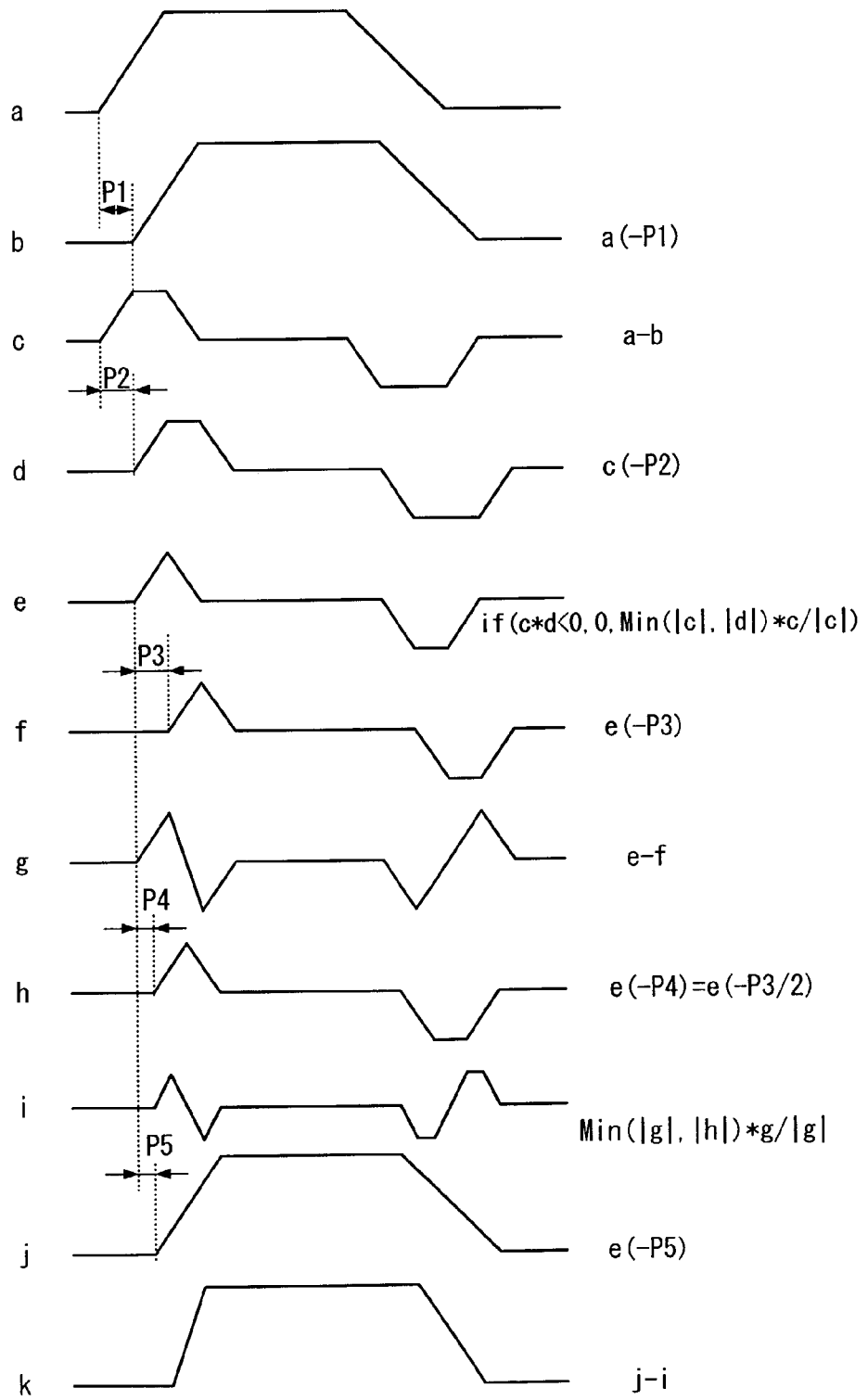
FIG. 18 is a waveform diagram comparatively illustrating an input video signal and an output video signal of the contour corrector shown in FIG. 17.
Figure 19:
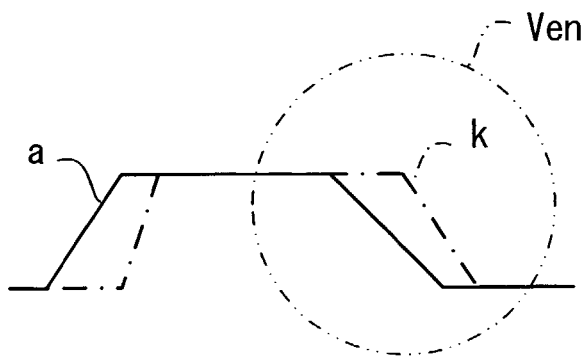
FIG. 19 is an explanatory diagram representing a contour correction result by the contour corrector shown in FIG. 18 of a video signal having a contour portion with a density gradient which is equal to or greater than a predetermined value.

Referring to FIG. 16, a contour corrector according to the fourth embodiment of the present invention will be described. The contour corrector OEp4 according to the present embodiment is constructed by combining the contour corrector OEp1 shown in FIG. 1 and the contour corrector OEp3 shown in FIG. 13. In other words, the contour corrector OEp4 includes the 2T delay unit 111 and the computation unit 112 of the contour corrector OEp1 in addition to the contour corrector OEp3. As a result, it has the features of both the contour corrector OEp1 and the contour corrector OEp3.

As described above, according to first embodiment of the present invention, the contour of a video signal is corrected by steepening a signal waveform in a portion undergoing a monotonous increase or monotonous decrease. Furthermore, by adaptively changing the correction value in accordance with the slope of the video signal, contour correction can be performed without degrading the characteristics of the original video image.

In the second and third embodiments, the contour of a video signal is corrected by steepening a signal waveform in a portion undergoing a monotonous increase or monotonous decrease, and contour correction can be performed without degrading the characteristics of the original video image, while suppressing any substantial deformation with respect to the characteristics of the original video image.

In the fourth embodiment, the contour of a video signal is corrected by steepening a signal waveform in a portion undergoing a monotonous increase or monotonous decrease. Furthermore, by adaptively changing the correction value in accordance with the slope of the video signal, contour correction can be performed without degrading the characteristics of the original video image, while suppressing any substantial deformation with respect to the characteristics of the original video image.

INDUSTRIAL APPLICABILITY

Thus, the present invention can be used for image displaying apparatuses in general, which reproduce images from an analog or digital video signal.

The invention claimed is:

1. A contour corrector for processing an input video signal based on a unit period corresponding to a pixel to emphasize a contour component of the input signal, comprising:

a first delay unit for generating a 2T-delayed input video signal by delaying the input video signal by twice the unit period, a first subtraction unit for generating a first primary differential signal by subtracting the first delayed input video signal from the input video signal, a second delay unit for generating a 2T-delayed primary differential signal by delaying the first primary differential signal by twice the unit period.

a minimum absolute value computation unit for generating a minimum primary differential signal by selecting a smaller one of the first primary different lot signal and the 2T-delayed primary differential signal, a third delay unit for generating a 2T-delayed minimum primary differential signal by delaying the minimum primary differential signal by twice the unit period, a second subtraction unit for generating a secondary differential signal by subtracting the first delayed minimum primary differential signal from the minimum primary differential signal Se, a fourth delay unit for generating a 1t-delayed minimum primary differential signal by delaying the minimum primary differential signal by the unit period, a second minimum value unit for generating a first correction signal by selecting a smaller one of the secondary differential signal and the 1T-delayed minimum primary differential signal a computation unit for generating a second correction signal by subjecting the first correction signal and the 2T-delayed primary differential signal to a computation based on a predetermined function, a fifth delay unit, for delaying the 3T-delayed input video signal by delaying the input video signal by three times the unit period, and a third subtraction unit for generating a contour-corrected video signal by subtracting the second correction signal from the 3T-delayed input video signal.

2. A contour corrector for processing an input video signal based on a unit period corresponding to a pixel to emphasize a contour component of the input signal, comprising:

a first delay unit for generating a 2T-delayed input video signal by delaying the input video signal by twice the unit period a first subtraction unit for generating a first primary differential signal by subtracting the first delayed input video signal from the input video signal, a second delay unit for generating a 2T-delayed primary differential signal by delaying the first primary differential signal by twice the unit period, a minimum absolute value computation unit for generating a minimum primary differential signal by selecting a smaller one of the first primary differential signal and the 2T-delayed primary differential signal.

a fourth delay unit for generating a 2T-delayed minimum primary differential signal by delaying the minimum primary differential signal by twice the unit period, a second subtraction unit for generating a secondary differential signal by subtracting the first delayed minimum primary differential signal from the minimum primary differential signal Se, a fifth delay unit for generating a 1T-delayed minimum primary differential signal by delaying the minimum primary differential signal by the unit period, a sixth delay unit for generating a 1T-delayed input video signal by delaying the input video signal by the unit period, a third subtraction unit for generating a second primary differential signal by subtracting the 1T-delayed input video signal from the input video signal, a seventh delay unit for generating a 3T-delayed input video signal by delaying the second primary differential signal by three times the unit period, a second minimum value unit for generating a first correction signal by selecting a smallest one of the secondary differential signal, the 1T-delayed minimum primary differential signal, and the second delayed primary differential signal, and a fourth subtraction unit for generating a contour-corrected video signal by subtracting the first correction signal from the 3T-delayed input video signal.

3. The contour corrector according to claim 2, further comprising an eighth delay unit for generating a 2T-delayed primary differential signal by delaying the second primary differential signal by twice the unit period, wherein the second minimum value unit generates the first correction signal by selecting a smallest one of the secondary differential signal, the 1T-delayed minimum primary differential signal, the second delayed primary differential signal, and the 2delayed primary differential signal.

4. The contour corrector according to claim 2, further comprising a computation unit for generating a second correction signal by subjecting the first correction signal and the 2T-delayed primary differential signal to a computation based on a predetermined function, wherein the fourth subtraction unit comprises a third subtraction unit for generating the contour-corrected video signal by subtracting the second correction signal from the 3T-delayed input video signal.

5. The contour corrector according to claim 1, wherein the computation unit performs the computation based on the predetermined function in accordance with a gray scale level of the input video signal.

6. The contour corrector according to claim 3, further comprising a computation unit for generating a second correction signal by subjecting the first correction signal and the 2T-delayed primary differential signal to a computation based on a predetermined function, wherein the fourth subtraction unit comprises a third subtraction unit for generating the contour-corrected video signal by subtracting the second correction signal from the 3T-delayed input video signal.

7. The contour corrector to claim 4, wherein the computation unit performs the computation based on the predetermined function in accordance with a gray scale level of the input video signal.

* * * * *